(12) United States Patent
Segawa et al.

(10) Patent No.: US 7,753,599 B2
(45) Date of Patent: Jul. 13, 2010

(54) ACCESSORIES AND ACCESSORY ATTACHING DEVICES WITH RETRACTABLE EXTERNALLY THREADED MEMBER

(75) Inventors: Yoshio Segawa, Kanagawa (JP); Fujio Nemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 356 days.

(21) Appl. No.: 11/899,534

(22) Filed: Sep. 6, 2007

(65) Prior Publication Data

US 2008/0063391 A1 Mar. 13, 2008

(30) Foreign Application Priority Data

Sep. 8, 2006 (JP) ............................ P2006-244853
Dec. 8, 2006 (JP) ............................ P2006-331977

(51) Int. Cl.
*G03B 17/00* (2006.01)
(52) U.S. Cl. ...................... 396/422; 396/544; D16/237; 348/375; 248/177.1; 248/187.1
(58) Field of Classification Search ................. 396/422; D16/243–245
See application file for complete search history.

(56) References Cited

U.S. PATENT DOCUMENTS 3,782,671 A * 1/1974 Igwe ........................ 248/183.4
4,746,944 A * 5/1988 Hiesinger ................... 396/425
5,322,251 A * 6/1994 Schumer et al. .......... 248/187.1

FOREIGN PATENT DOCUMENTS

| JP | 9 247511 | 9/1997 |
| JP | 2003-7103 | 1/2003 |
| JP | 2006-208912 | 8/2006 |

* cited by examiner

*Primary Examiner*—W. B. Pekey
*Assistant Examiner*—Bret Adams
(74) *Attorney, Agent, or Firm*—Frommer Lawrence & Haug LLP; William S. Frommer; Thomas F. Presson

(57) ABSTRACT

An accessory includes an apparatus-side portion and an accessory-side portion to be attached to the apparatus-side portion. The accessory-side portion includes a surface, an internally threaded portion open on the surface, and an externally threaded member to be rotatably engaged with the internally threaded portion. The externally threaded member is positioned either in a retraction position by rotation of the externally threaded member in one direction or in an extension position by rotation of the externally threaded member in an opposite direction.

13 Claims, 20 Drawing Sheets

ACCESSORIES AND ACCESSORY ATTACHING DEVICES WITH RETRACTABLE EXTERNALLY THREADED MEMBER

CROSS REFERENCES TO RELATED APPLICATIONS

The present invention contains subject matter related to Japanese Patent Applications JP 2006-244853 and JP 2006-331977 filed in the Japanese Patent Office on Sep. 8, 2006 and Dec. 8, 2006, respectively, the entire contents of which being incorporated herein by reference.

BACKGROUND OF THE INVENTION

1. Field of the Invention

The present invention relates to accessories for use by being attached to apparatuses, and accessory attaching devices.

2. Description of the Related Art

Accessories for use with image capture apparatuses, such as digital cameras and video cameras, are known. Such accessories include, for example, strobe flashlights for emitting auxiliary light and microphones for collecting audio. The respective accessories are used not only by being attached to apparatuses such as an image capture apparatus, but also by being attached to equipment such as a grip, tripod, or the like, depending on the case.

The respective accessory, such as described above, is detachably or removably attached to the equipment in such a manner that an accessory-side apparatus detachably attaching portion provided to the accessory is fitted to an equipment-side detachably attaching portion provided to the equipment.

As in previously proposed techniques, detachably attaching portions having constructions as described hereinbelow ((1) and (2)) are provided.

(1) Construction in which a detachably attaching portion is formed to include an accessory shoe.

In this case, the accessory shoe is formed by bending a metal plate into a cross-sectionally U shape to be open upward, in which upper edge portions on both sides of the metal plate are bent to be close to one another. Grooves for engaging with the edge portions on both sides of the metal plate are formed, and the edge portions are inserted into the grooves for engagement therewith, whereby the accessory is attached to the apparatus (see Patent Publication 1 (Japanese Unexamined Patent Application Publication No. 09-247511)).

2) Construction in which a detachably attaching portion is formed to include an internally threaded portion.

In this case, an accessory-side apparatus detachably attaching portion is formed to include an externally threaded portion for engagement with the internally threaded portion, whereby the accessory is attached to the apparatus.

3) Construction in which a detachably attaching portion is formed to include an externally threaded portion.

In this case, an accessory-side apparatus detachably attaching portion is formed to include internally threaded portion for engagement with the externally threaded portion, whereby the accessory is attached to the apparatus.

SUMMARY OF THE INVENTION

As described above, a plurality of constructions of detachably attaching portions are available. For example, now suppose that an accessory is intended to be used by being attached to a to-be-attached apparatus while the constructions of detachably attaching portions on two sides (accessory and to-be-attached apparatus sides) do not correspond to one another. More specifically, suppose that a detachably attaching portion is of the type including internally threaded portion, and an accessory-side apparatus detachably attaching portion is of the type for use with an accessory shoe. In this case, it is necessary to use a dedicated adaptor including externally threaded portion engageable with internally threaded portion on the side of the to-be-attached apparatus.

Thus, in the case that an accessory is intended to be used by being attached to an apparatus having a detachably attaching portion not corresponding in construction to a detachably attaching portion of a to-be-attached apparatus, not only additional costs for an adapter occur, but also attaching operation is complicate because of the adaptor being used. Further, time-consuming labor is necessary for management to prevent various adaptors from being lost, and hence usability is inferior.

Under these circumstances, it would be desirable to provide accessories respectively easily attachable to various types of detachably attaching portions of to-be-attached apparatuses without using adaptors, and accessory attaching devices for the accessory.

According to one embodiment of the present invention, an accessory to be detachably attached to an apparatus-side detachably attaching portion of an apparatus is provided. The accessory includes an apparatus-side detachably attaching portion including an accessory-side apparatus detachably attaching portion to be attached to the apparatus-side detachably attaching portion, the accessory-side apparatus detachably attaching portion including an attachment/detachment surface, an internally threaded portion open on the attachment/detachment surface, and an externally threaded member to be rotatably engaged with the internally threaded portion. The externally threaded member is positioned either in a retraction position by rotation of the externally threaded member in one direction or in an extension position by rotation of the externally threaded member in an other direction opposite to the one direction. The retraction position is a position wherein a lead end portion of the externally threaded portion of the externally threaded member is retracted into the internally threaded portion and the externally threaded portion is exposed on the attachment/detachment surface. The extension position being a position wherein the lead end portion of the externally threaded member is extended from the attachment/detachment surface.

According to another embodiment of the present invention, an accessory attaching device is provided. The accessory attaching device includes a housing; a rotationally operable ring built-in in the housing; an externally threaded member built-in in the housing; and an accessory-side apparatus detachably attaching portion detachably attachable to an apparatus-side detachably attaching portion of an apparatus, such as an electronic apparatus or tripod, and an accessory attaching portion for attaching the accessory, in mutually opposite portions of the housing. The accessory-side apparatus detachably attaching portion includes an attachment/detachment surface extending over a plane perpendicular to a direction connecting together the accessory-side apparatus detachably attaching portion and the accessory attaching portion. A portion of the housing constituting the accessory-side apparatus detachably attaching portion includes an internally threaded portion extending perpendicular to the attachment/detachment surface and open on the attachment/detachment surface. An interior portion of the housing includes a spacing in communication with the internally threaded portion. The rotationally operable ring is supported by the housing, with a central portion positioned in the spacing, to be immobilizable along an axial direction of the internally threaded portion and to be rotatable about an axial center of the internally threaded portion. The externally threaded member is disposed on the axial center of the internally threaded portion in the spacing, wherein, in a central portion of the rotationally operable ring, the externally threaded member is movable along the axial direction of the internally threaded portion and includes a longitudinal part coupled to the rotationally operable ring to be integrally rotatable with the rotationally operable ring about the axial center of the internally threaded portion. The externally threaded member is positioned either in a retraction position by rotation of the rotationally operable ring in an other direction opposite to the one direction, the retraction position being a position. The retraction position is a position wherein the externally threaded portion of the externally threaded member is retracted from the internally threaded portion. The extension position being a position wherein the externally threaded portion of the externally threaded member engaged with the internally threaded portion and a lead end portion of the externally threaded portion is extended from the attachment/detachment surface.

According to still another embodiment of the present invention, an accessory to be detachably attached to an apparatus-side detachably attaching portion of an apparatus is provided. The accessory includes an accessory body and an accessory attaching device. The accessory attaching device includes a housing; a rotationally operable ring built-in in the housing; an externally threaded member built-in in the housing; and an accessory-side apparatus detachably attaching portion detachably attachable to an apparatus-side detachably attaching portion of an apparatus, such as an electronic apparatus or tripod, and an accessory attaching portion for attaching the accessory, in mutually opposite portions of the housing. The accessory-side apparatus detachably attaching portion includes an attachment/detachment surface extending over a plane perpendicular to a direction connecting together the accessory-side apparatus detachably attaching portion and the accessory attaching portion. A portion of the housing constituting the accessory-side apparatus detachably attaching portion includes an internally threaded portion extending perpendicular to the attachment/detachment surface and open on the attachment/detachment surface. An interior portion of the housing includes a spacing in communication with the internally threaded portion. The rotationally operable ring is supported by the housing, with a central portion positioned in the spacing, to be immobilizable along an axial direction of the internally threaded portion and to be rotatable about an axial center of the internally threaded portion. The externally threaded member is disposed on the axial center of the internally threaded portion in the spacing, wherein, in a central portion of the rotationally operable ring, the externally threaded member is movable along the axial direction of the internally threaded portion and includes a longitudinal part coupled to the rotationally operable ring to be integrally rotatable with the rotationally operable ring about the axial center of the internally threaded portion. The externally threaded member is positioned either in a retraction position by rotation of the rotationally operable ring in an other direction opposite to the one direction, the retraction position being a position. The retraction position is a position wherein the externally threaded portion of the externally threaded member is retracted from the internally threaded portion. The extension position being a position wherein the externally threaded portion of the externally threaded member engaged with the internally threaded portion and a lead end portion of the externally threaded portion is extended from the attachment/detachment surface.

According to still another embodiment of the present invention, an accessory to be detachably attached to an apparatus-side detachably attaching portion of an apparatus is provided. The accessory includes an accessory attaching device integrated with an accessory body. The accessory attaching device includes a housing; a rotationally operable ring built-in in the housing; an externally threaded member built-in in the housing; and an accessory-side apparatus detachably attaching portion detachably attachable to an apparatus-side detachably attaching portion of an apparatus, such as an electronic apparatus or tripod, and an accessory attaching portion for attaching the accessory, in mutually opposite portions of the housing. The accessory-side apparatus detachably attaching portion includes an attachment/detachment surface extending over a plane perpendicular to a direction connecting together the accessory-side apparatus detachably attaching portion and the accessory attaching portion. A portion of the housing constituting the accessory-side apparatus detachably attaching portion includes an internally threaded portion extending perpendicular to the attachment/detachment surface and open on the attachment/detachment surface. An interior portion of the housing includes a spacing in communication with the internally threaded portion. The rotationally operable ring is supported by the housing, with a central portion positioned in the spacing, to be immobilizable along an axial direction of the internally threaded portion and to be rotatable about an axial center of the internally threaded portion. The externally threaded member is disposed on the axial center of the internally threaded portion in the spacing, wherein, in a central portion of the rotationally operable ring, the externally threaded member is movable along the axial direction of the internally threaded portion and includes a longitudinal part coupled to the rotationally operable ring to be integrally rotatable with the rotationally operable ring about the axial center of the internally threaded portion. The externally threaded member is positioned either in a retraction position by rotation of the rotationally operable ring in an other direction opposite to the one direction, the retraction position being a position. The retraction position is a position wherein the externally threaded portion of the externally threaded member is retracted from the internally threaded portion. The extension position being a position wherein the externally threaded portion of the externally threaded member engaged with the internally threaded portion and a lead end portion of the externally threaded portion is extended from the attachment/detachment surface.

The respective accessory and accessory attaching device according to the respective embodiment of the present invention are constructed by using the internally threaded portion and the externally threaded member, such that the accessory can be detachably attached to any one of a plurality of apparatus-side detachably attaching portions without using an adaptor.

DETAILED DESCRIPTION OF THE PREFERRED EMBODIMENTS

Embodiments and examples of the present invention will be described below with reference to the accompanying drawings.

First Embodiment

A first embodiment will be described herebelow. More specifically, the first embodiment will be described with reference to an example case where four types of accessories are attached to an apparatus-side detachably attaching portion.

Figure 1:
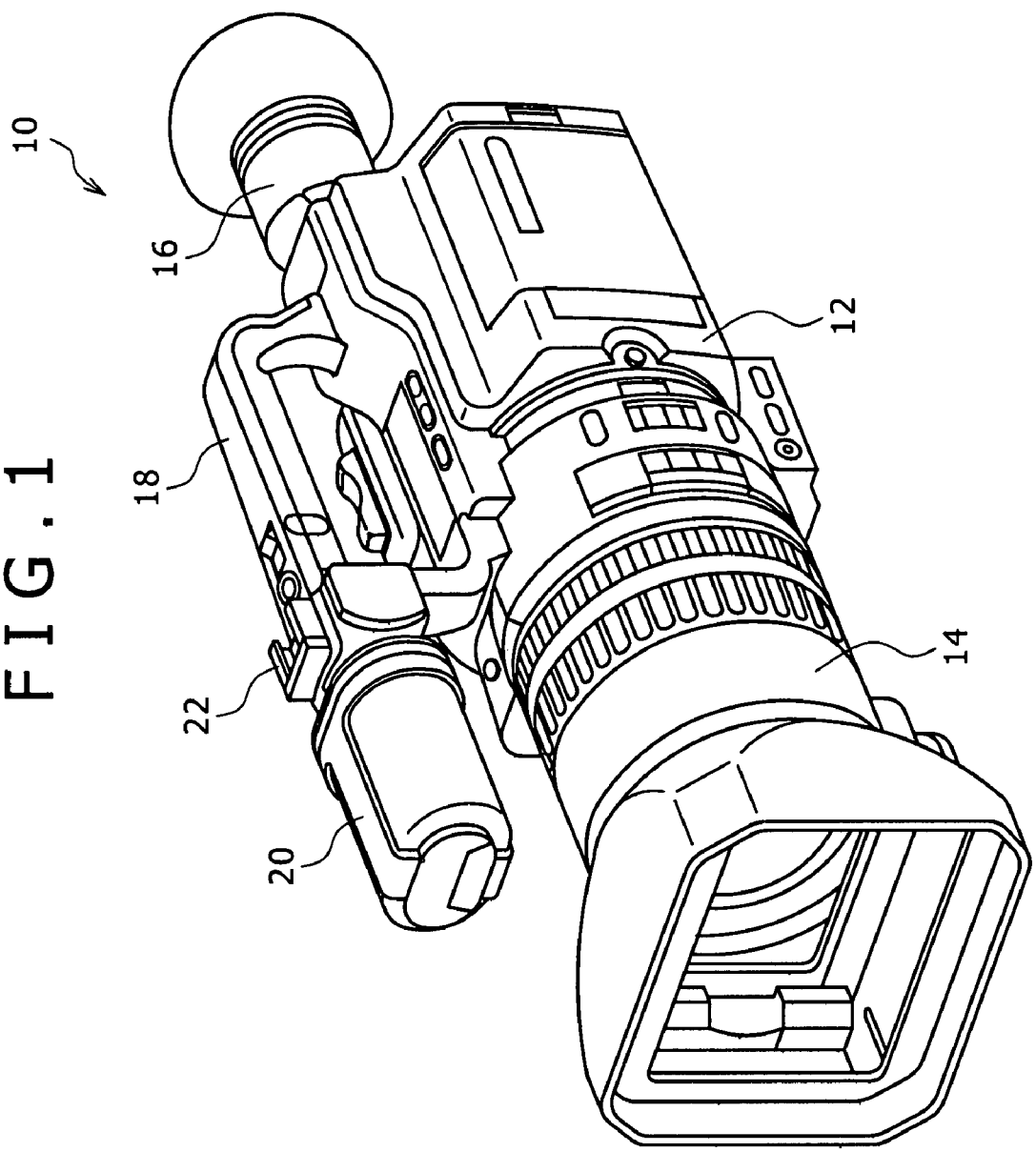
FIG. 1 is a perspective view of a video camera, showing one example of a detachably attaching portion.
Figure 2:
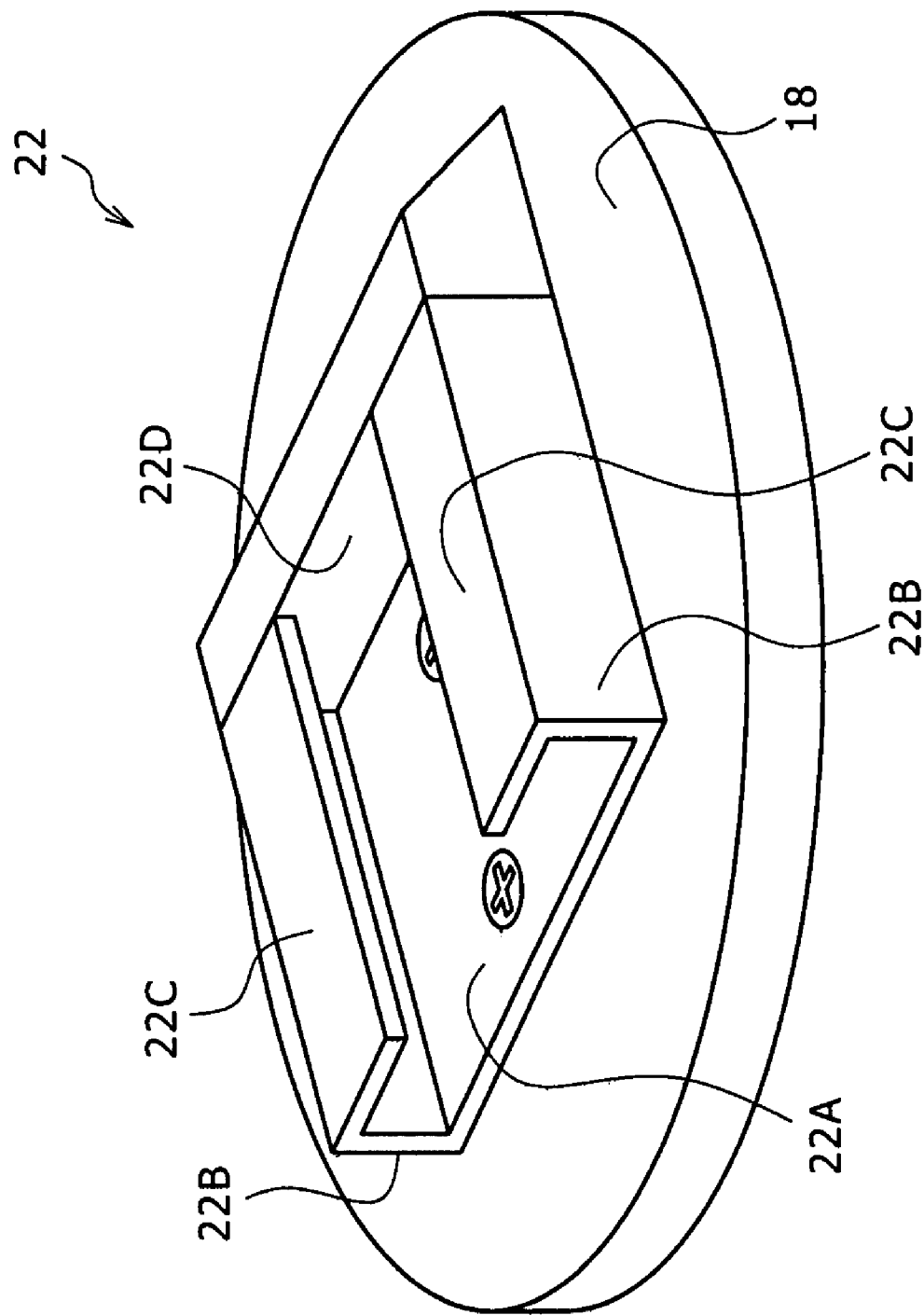
FIG. 2 is a perspective view of the detachably attaching portion of the video camera shown in FIG. 1.

FIG. 1 is a perspective view of a video camera 10, showing one example of an apparatus-side detachably attaching portion 22. FIG. 2 is a perspective view of the apparatus-side detachably attaching portion 22 of the video camera 10. FIG. 2 is a perspective view of the apparatus-side detachably attaching portion of the video camera shown in FIG. 1.

The example shown in FIGS. 1 and 2 has a configuration that includes an accessory of the present embodiment attached to a video camera 10, a housing 12 constituting the exterior housing of the video camera 10, a lens barrel 14 provided in a front portion of the housing 12, a viewfinder 16 provided in a rear portion of the housing 12, a handle 18 provided extending over a front-rear portion of the housing 12, and a microphone 20 provided to the handle 18.

The apparatus-side detachably attaching portion 22 to which an accessory is to be detachably attached is provided in a portion close to the microphone 20 of the handle 18.

With reference to FIG. 2, the apparatus-side detachably attaching portion 22 constitutes an accessory shoe, and includes a bottom 22A, two lateral walls 22B, and two engagement walls 22C. The bottom 22A is attached to an upper surface of the handle 18. The respective lateral walls 22B elevates upright from two or both sides of the bottom plate 22A. The engagement walls 22C, respectively, are bent from upper end portions of the respective lateral walls 22B so that end portions thereof are close or opposite to one another and are parallel to the bottom 22A. One of two sides in the extension direction of the engagement walls 22C is left open, and the other side is closed by a wall portion 22D.

Figure 3:
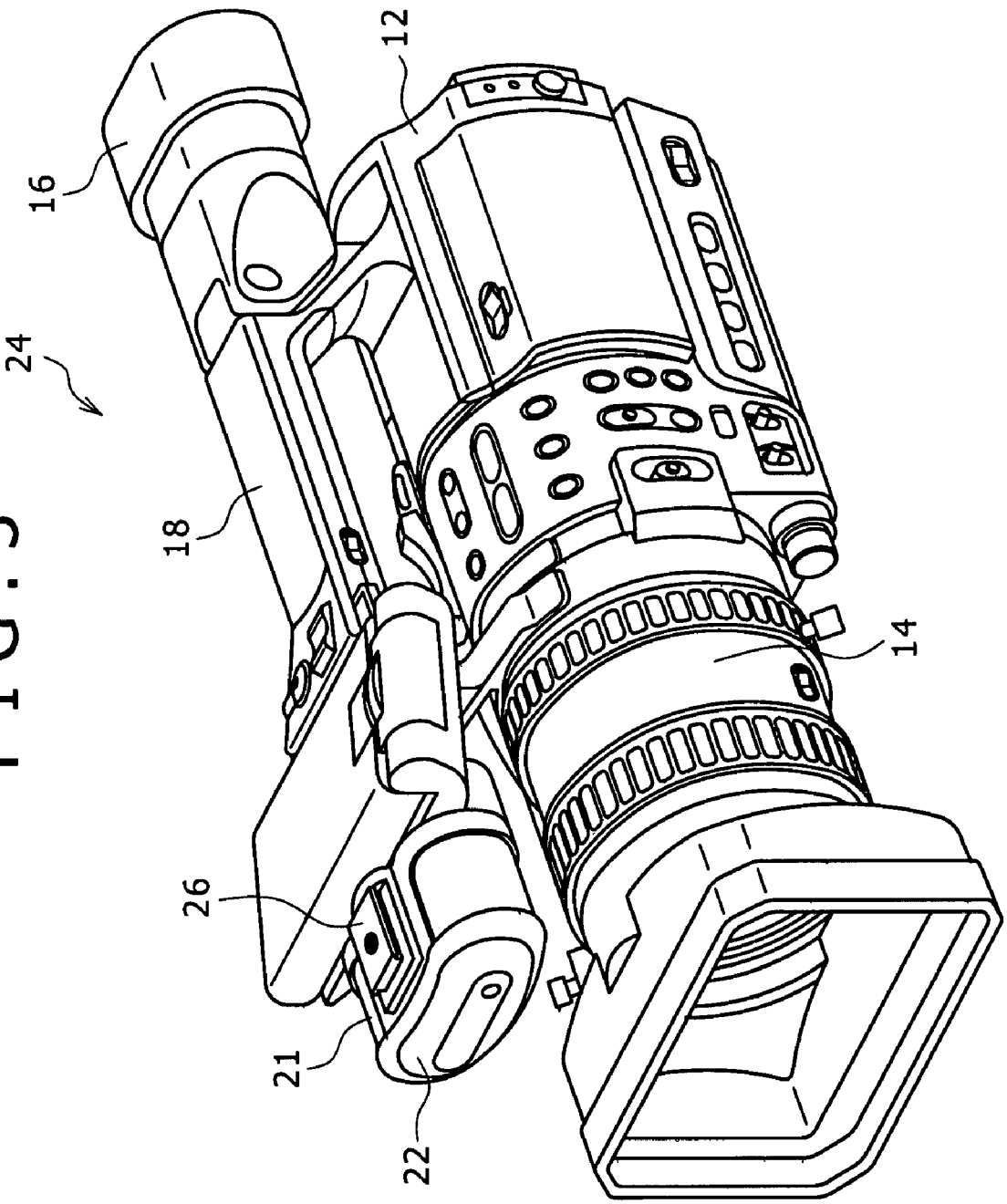
FIG. 3 is a perspective view of a video camera, showing another example of a detachably attaching portion.
Figure 4:
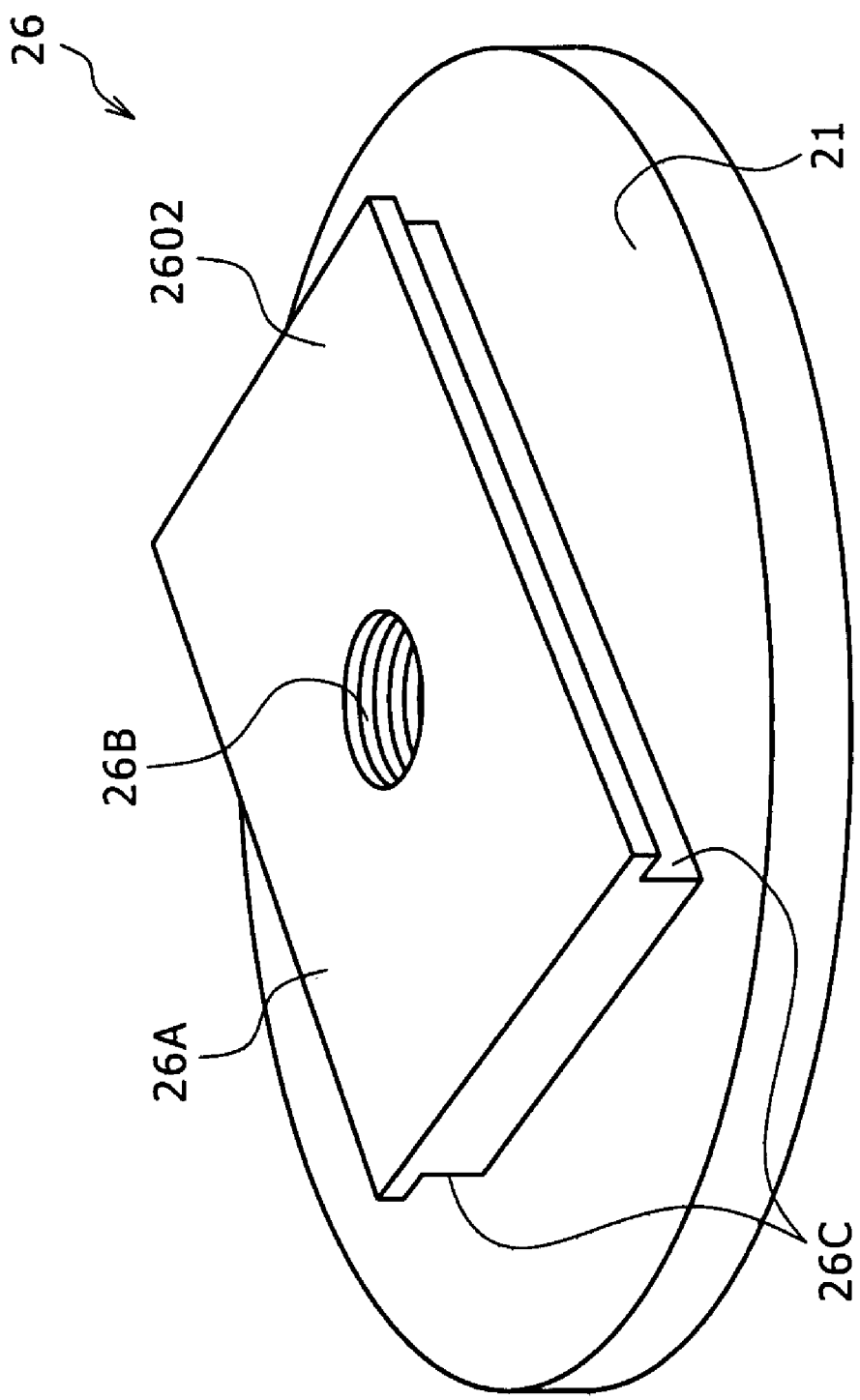
FIG. 4 is a perspective view of the detachably attaching portion of the video camera shown in FIG. 3.

FIG. 3 is a perspective view of a video camera 24, showing another example of an apparatus-side detachably attaching portion 26. FIG. 4 is a perspective view of the apparatus-side detachably attaching portion 26 of the video camera 24 shown in FIG. 3.

With reference to FIG. 3, similarly to the video camera 10 shown in FIG. 1, the video camera 24 includes a housing 12, a lens barrel 14, a viewfinder 16, a handle 18, and microphone 20.

The apparatus-side detachably attaching portion 26 to which an accessory is detachably attached is provided in an upper portion of a housing 21 constituting the microphone 20.

With reference to FIG. 4, the apparatus-side detachably attaching portion 26 includes a rectangularly planar seating 26A projecting from the upper surface of the housing 21. An upper surface 2602 of the seating 26A is flat. An internally threaded portion 26B is formed in a center of the upper surface 2602 along the direction perpendicular to the upper surface 2602.

In addition, adaptor-mounting engagement grooves 26C, respectively, are formed on two lateral surfaces of the seating 26A.

Figure 5:
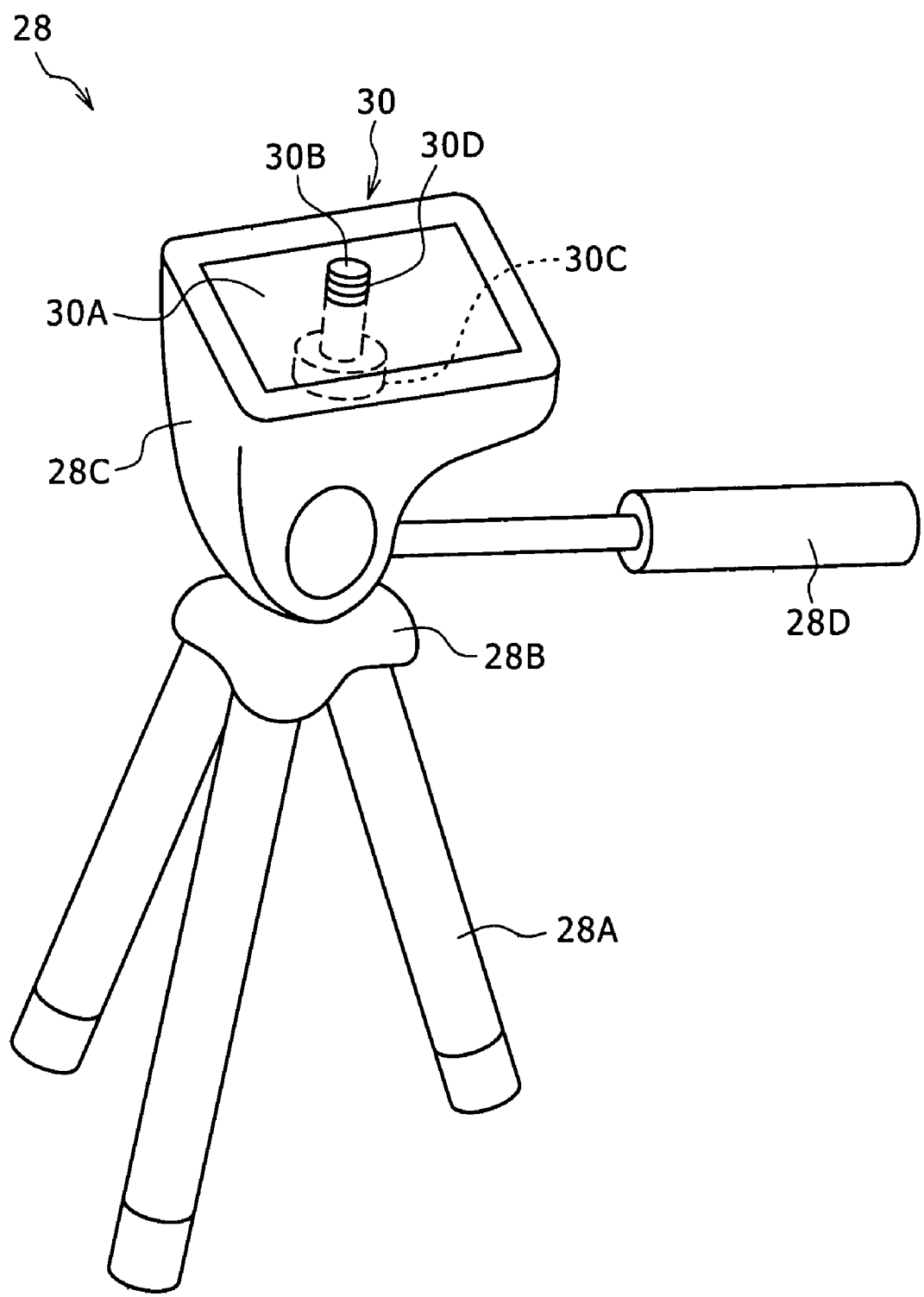
FIG. 5 is a perspective view of a tripod, showing another example of a detachably attaching portion.

FIG. 5 is a perspective view of a tripod 28, showing another example of an apparatus-side detachably attaching portion.

With reference to FIG. 5, the tripod 28 includes three leg portions 28A, a connection section 28B for connecting upper end portions of the leg portions 28A, a head 28C pivotably connected to an upper portion of the connection section 28B, and an operation stick 28D that operates the head 28C to perform pivotally movement and locks the ball head 28C to restrain the pivotal movement.

The ball head 28C includes an apparatus-side detachably attaching portion 30 for attachment/detachment of any one of, for example, various accessories and electronic devices or apparatuses.

The apparatus-side detachably attaching portion 30 includes a flat attachment surface 30A and a screw member 30B.

The screw member 30B is held rotatably and non-disengageably held to the head 28C in the state head portion 30C of the screw member 30B is positioned in a lower portion of the head 28C and an externally threaded portion 30D extends upward from the center of the flat attachment surface 30A.

Figure 6:
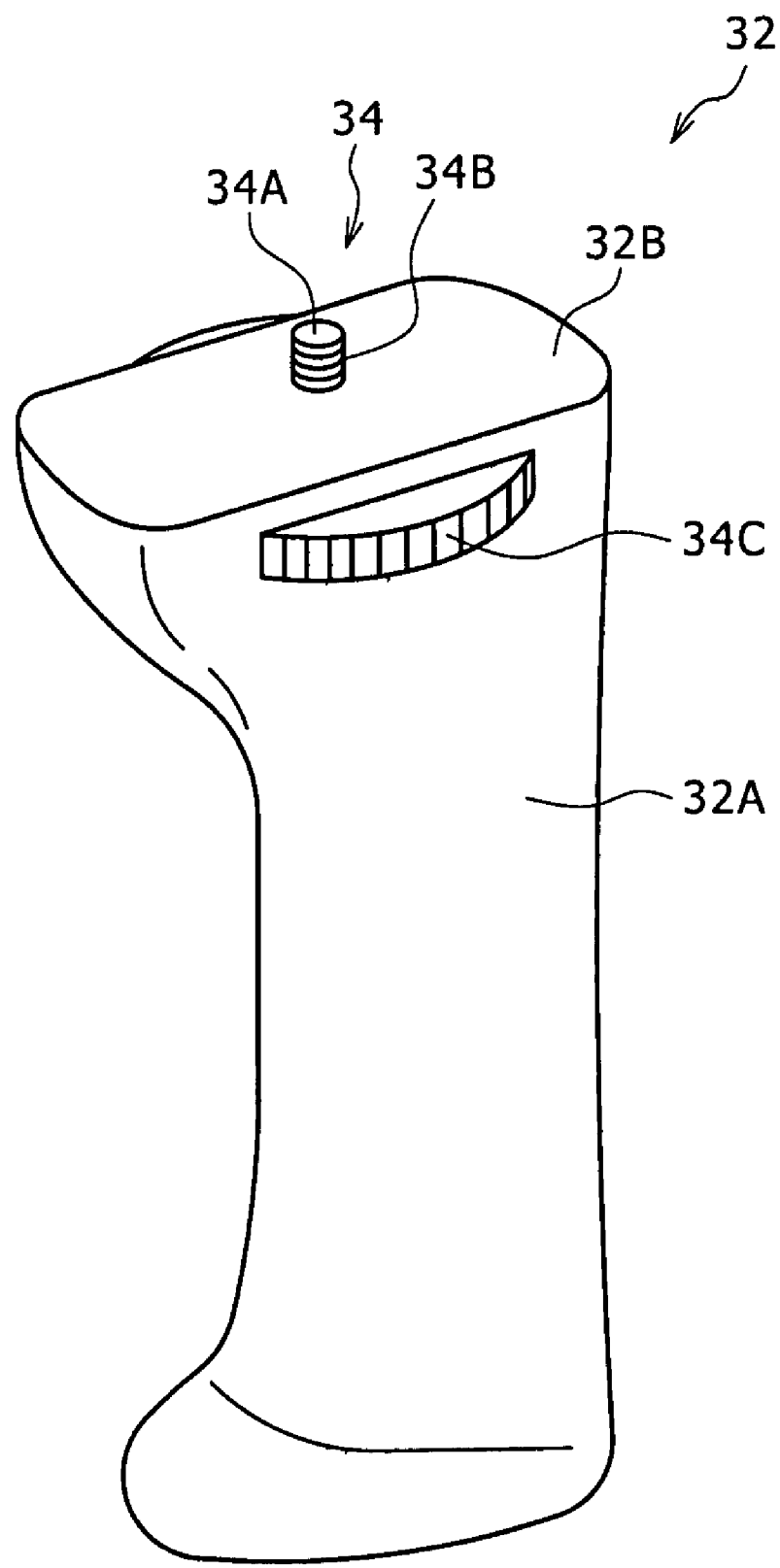
FIG. 6 is a perspective view of a grip, showing another example of a detachably attaching portion.

FIG. 6 is a perspective view of a grip, showing another example of an apparatus-side detachably attaching portion 34.

With reference to FIG. 6, a grip 32 includes a columnar body 32A for being manually (hand) gripped, in which an upper portion of the body 32 has the apparatus-side detachably attaching portion 34 for use of attachment/detachment of any one of various accessories and electronic devices or apparatuses.

The apparatus-side detachably attaching portion 34 includes a flat attachment surface 32B and a screw member 34A.

The screw member 34A is held rotatably and non-disengageably held to the body 32A so that a ring 34C of the apparatus-side detachably attaching portion 34 is exposed from two sides of the body 32A. In this state, an externally threaded portion 34B of the screw member 34A extends upward from the center of the attachment surface 32B.

An accessory and accessory attaching device according to the present embodiment will now be described herebelow.

Figure 7:
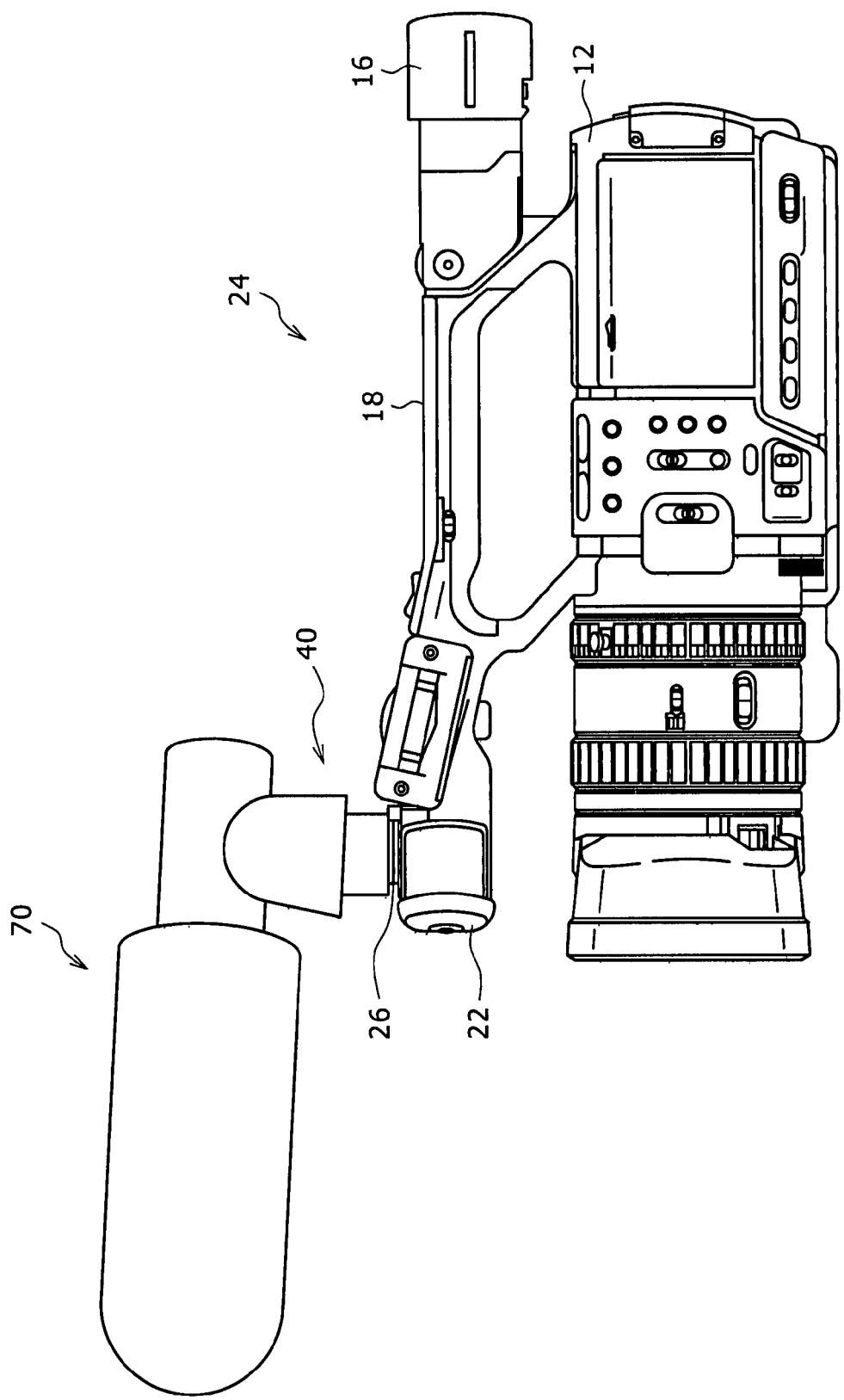
FIG. 7 is a view showing a state where a microphone, which is an accessory (accessory body=microphone), is attached to an image capture apparatus.
Figure 8:
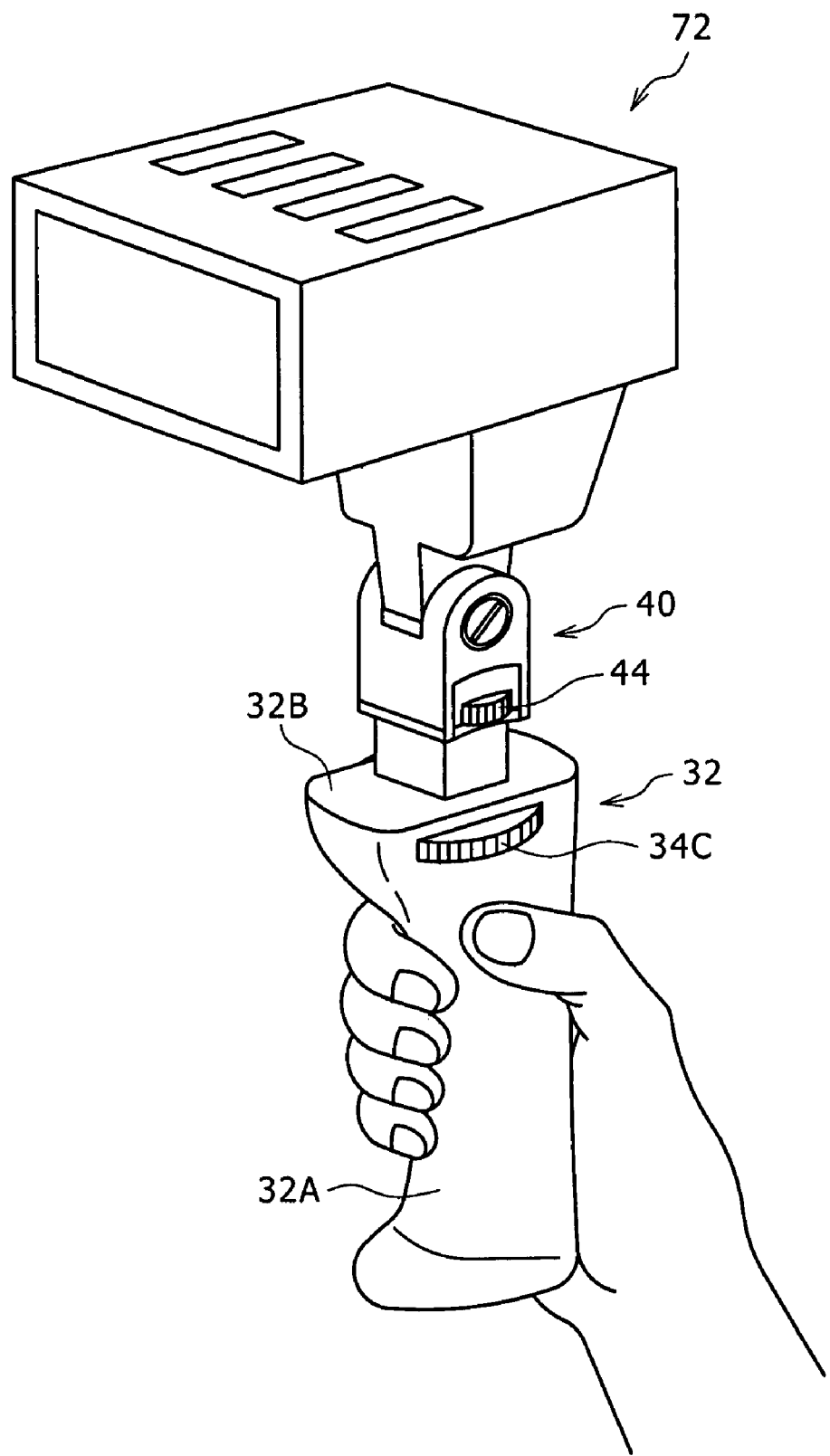
FIG. 8 is a view showing a state where a video light, which is an accessory (accessory body=video light), is attached to the grip.

FIG. 7 is a view showing a state where a microphone 70, which is an accessory (accessory body=microphone 70), is attached to an image capture apparatus 24. FIG. 8 is a view showing a state where a video light 72, which is an accessory (accessory body=video light 72), is attached to the grip 32.

Figure 9:
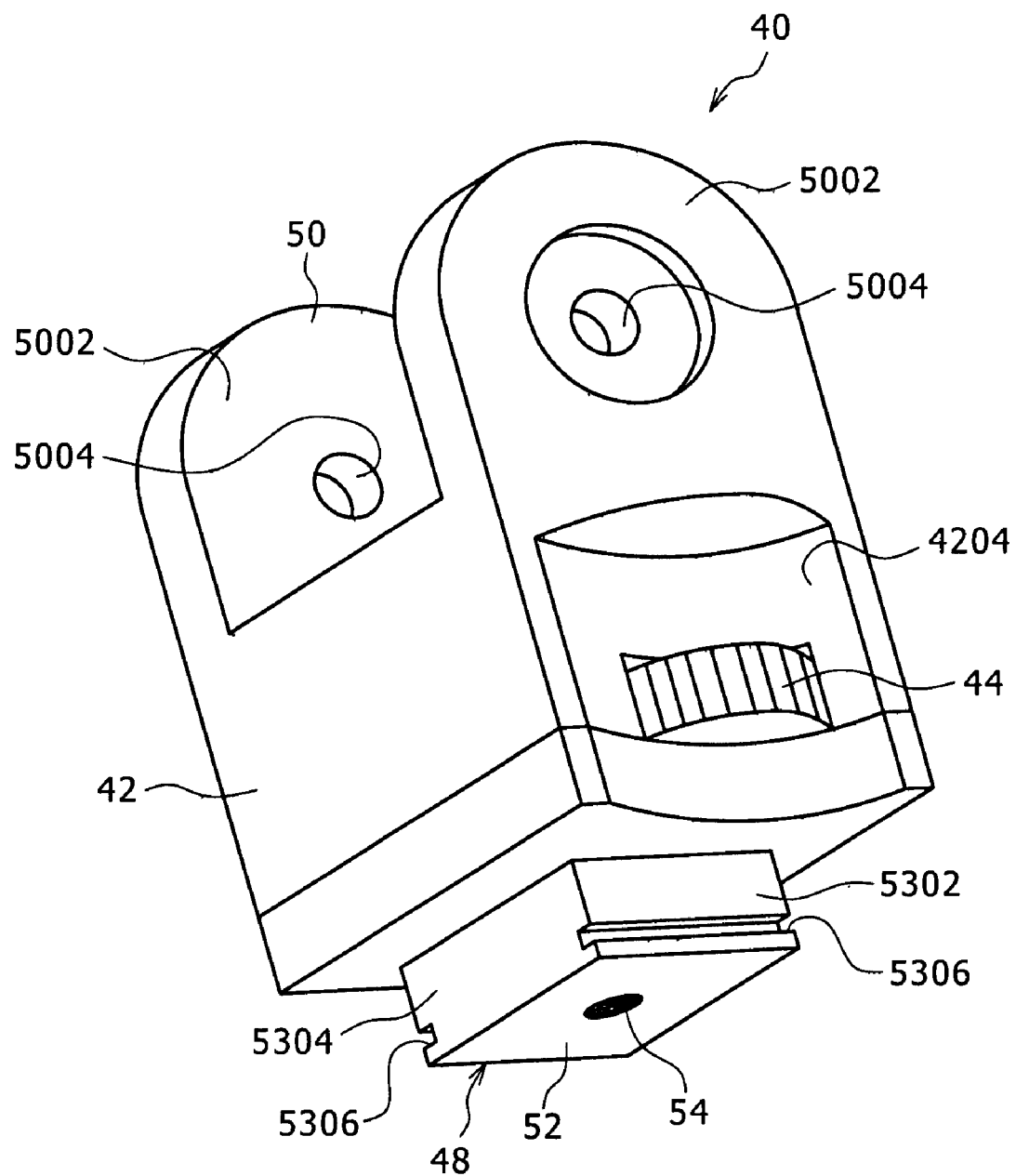
FIG. 9 is a perspective view of an accessory attaching device.
Figure 10:
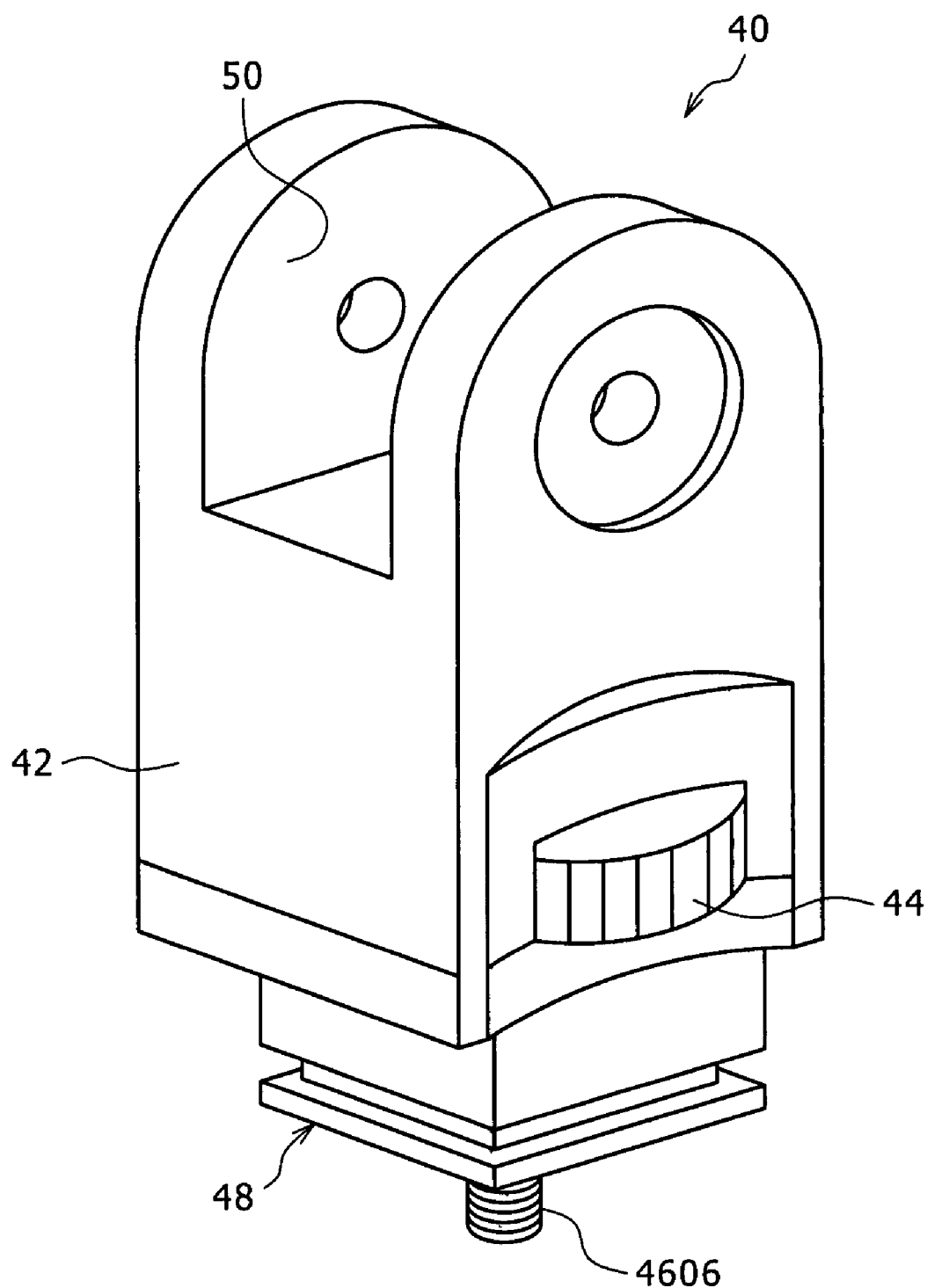
FIG. 10 is an enlarged view of the accessory attaching device.
Figure 11:
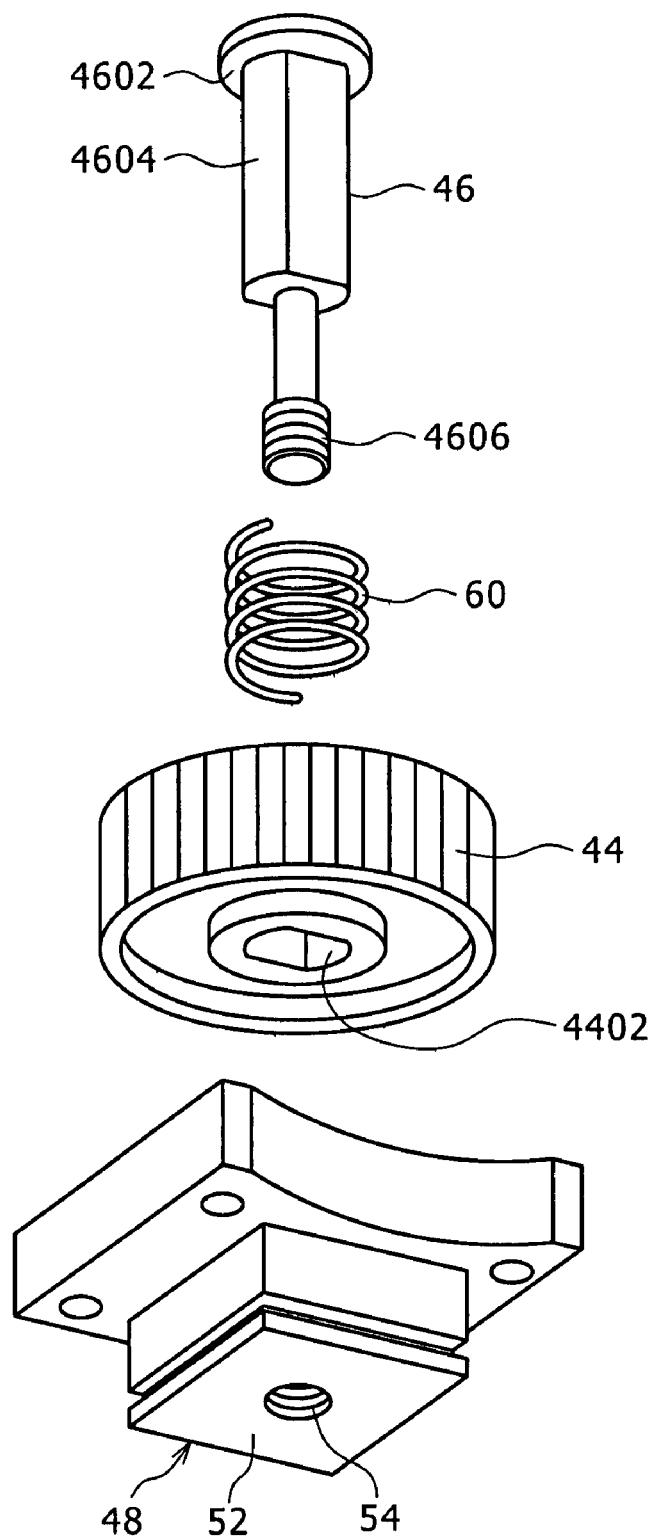
FIG. 11 is an exploded perspective view of the accessory attaching device.

FIGS. 9 and 10 are perspective views of an accessory attaching device 40. FIG. 11 is an exploded perspective view of the accessory attaching device 40.

Figure 12:
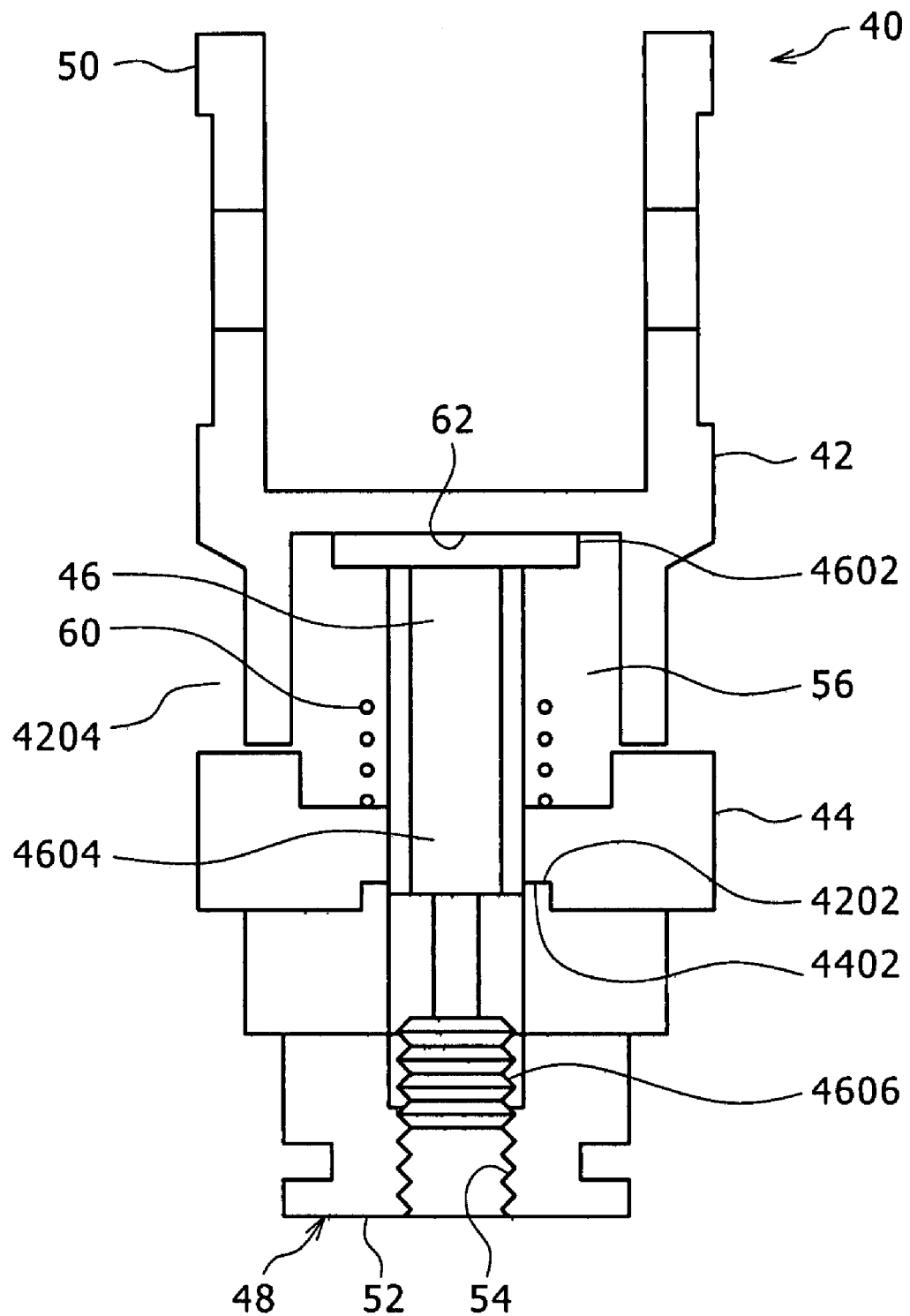
FIG. 12 is a cross sectional view of the accessory attaching device in a state where an externally threaded member is positioned in a retracted position.
Figure 13:
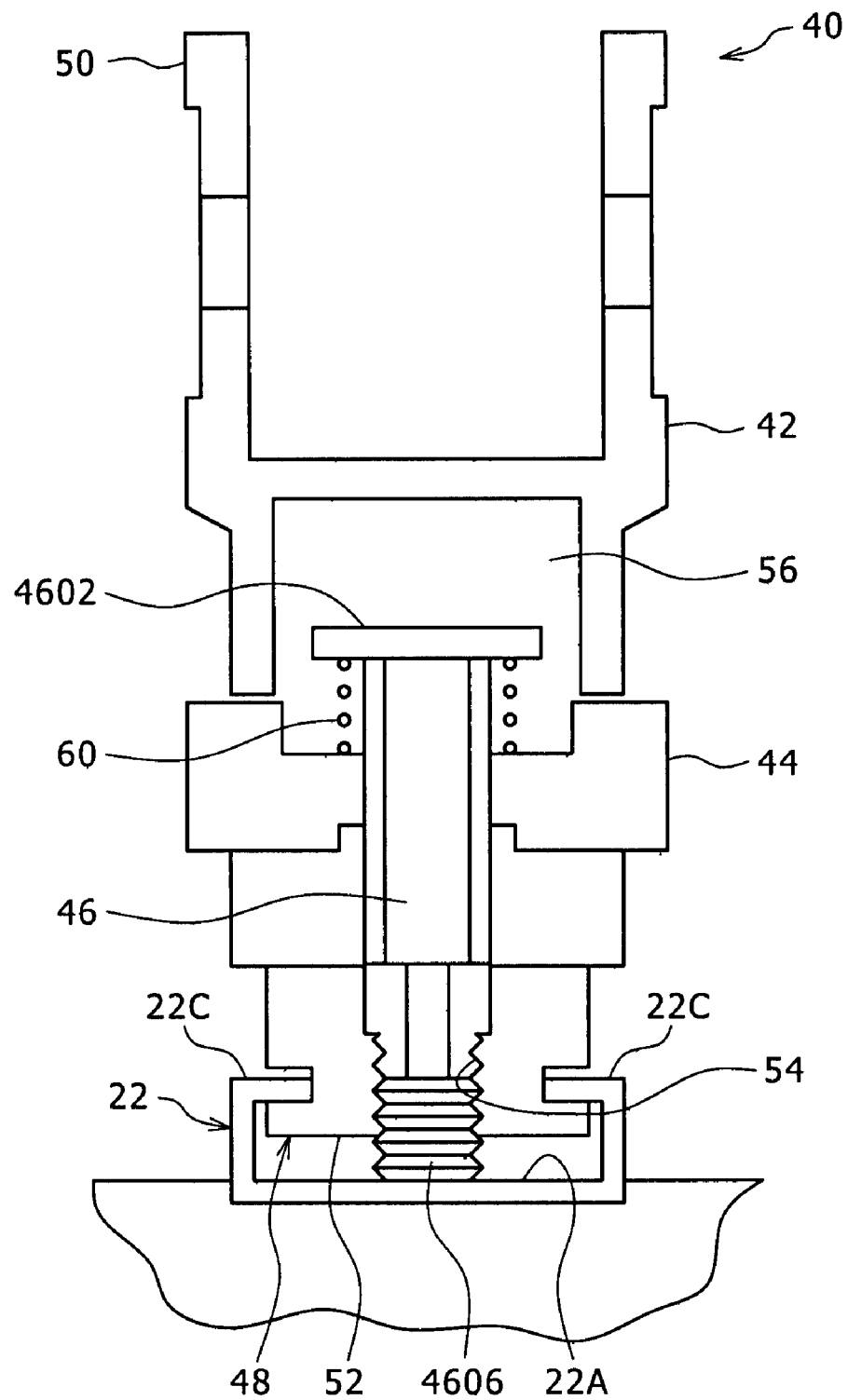
FIG. 13 is a cross sectional view of the accessory attaching device in a state where the externally threaded member is positioned in an intermediate position between the retracted position and an extended position.
Figure 14:
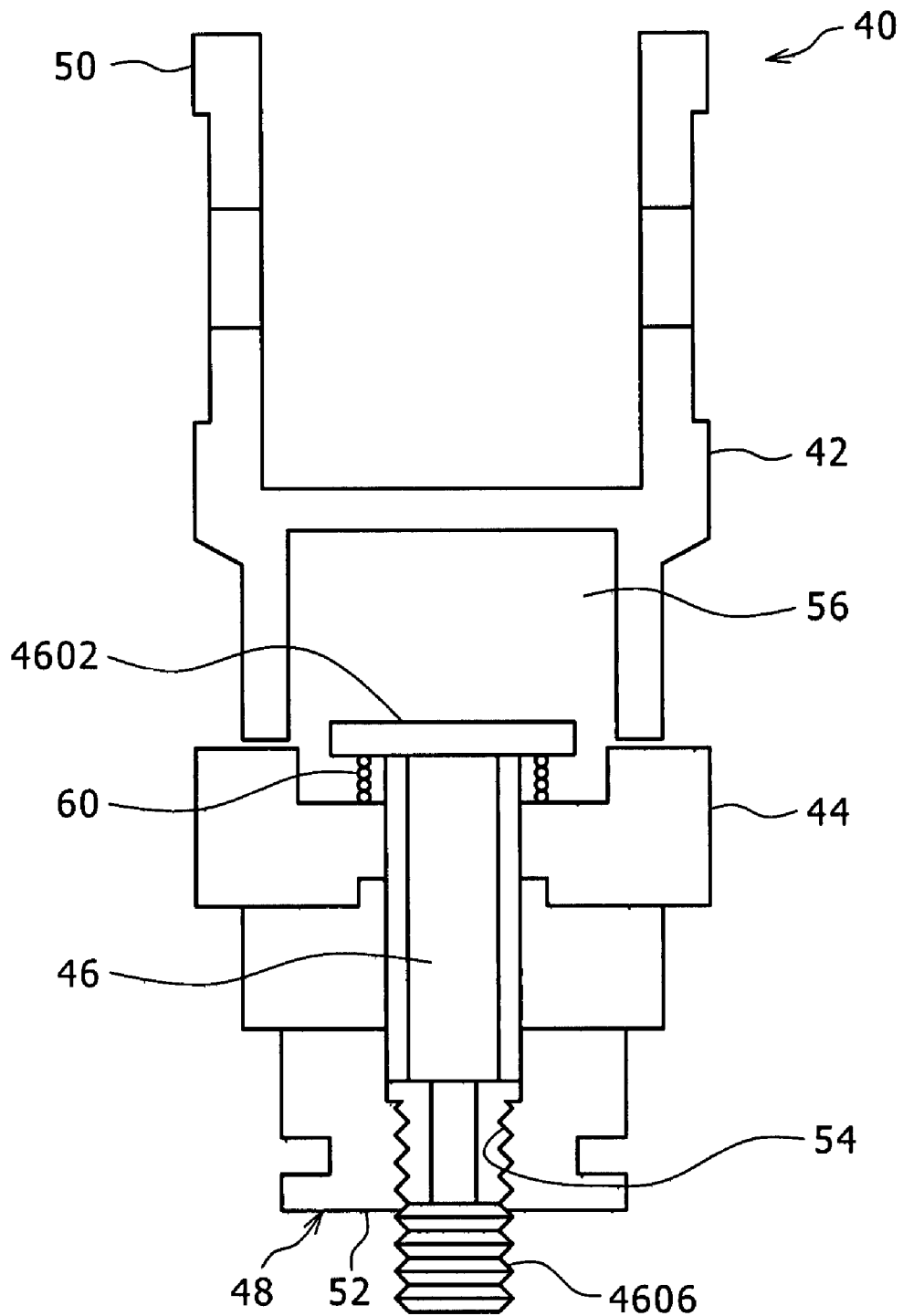
FIG. 14 is a cross sectional view of the accessory attaching device in a state where the externally threaded member is positioned in the extended position.

FIG. 12 is a cross sectional view of the accessory attaching device 40 in a state where an externally threaded member 46 is positioned in a retraction position. FIG. 13 is a cross sectional view of the accessory attaching device 40 in a state where the externally threaded member 46 is positioned in an intermediate position between the retraction position and an extension position. FIG. 14 is a cross sectional view of the accessory attaching device 40 in a state where the externally threaded member 46 is positioned in the extension position.

Figure 15:
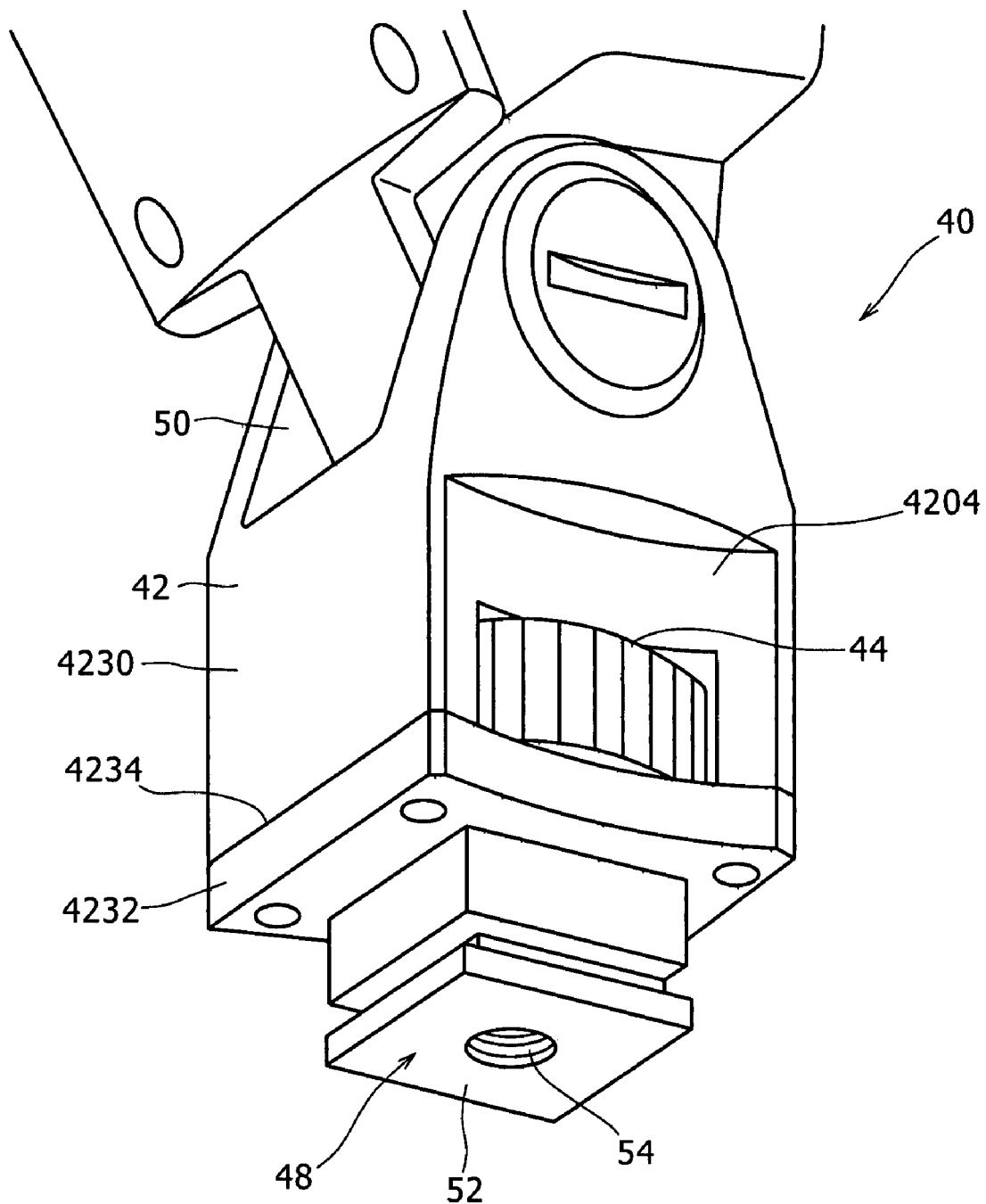
FIG. 15 is a perspective view of the accessory attaching device in a state where the externally threaded member is positioned in the retracted position.
Figure 16:
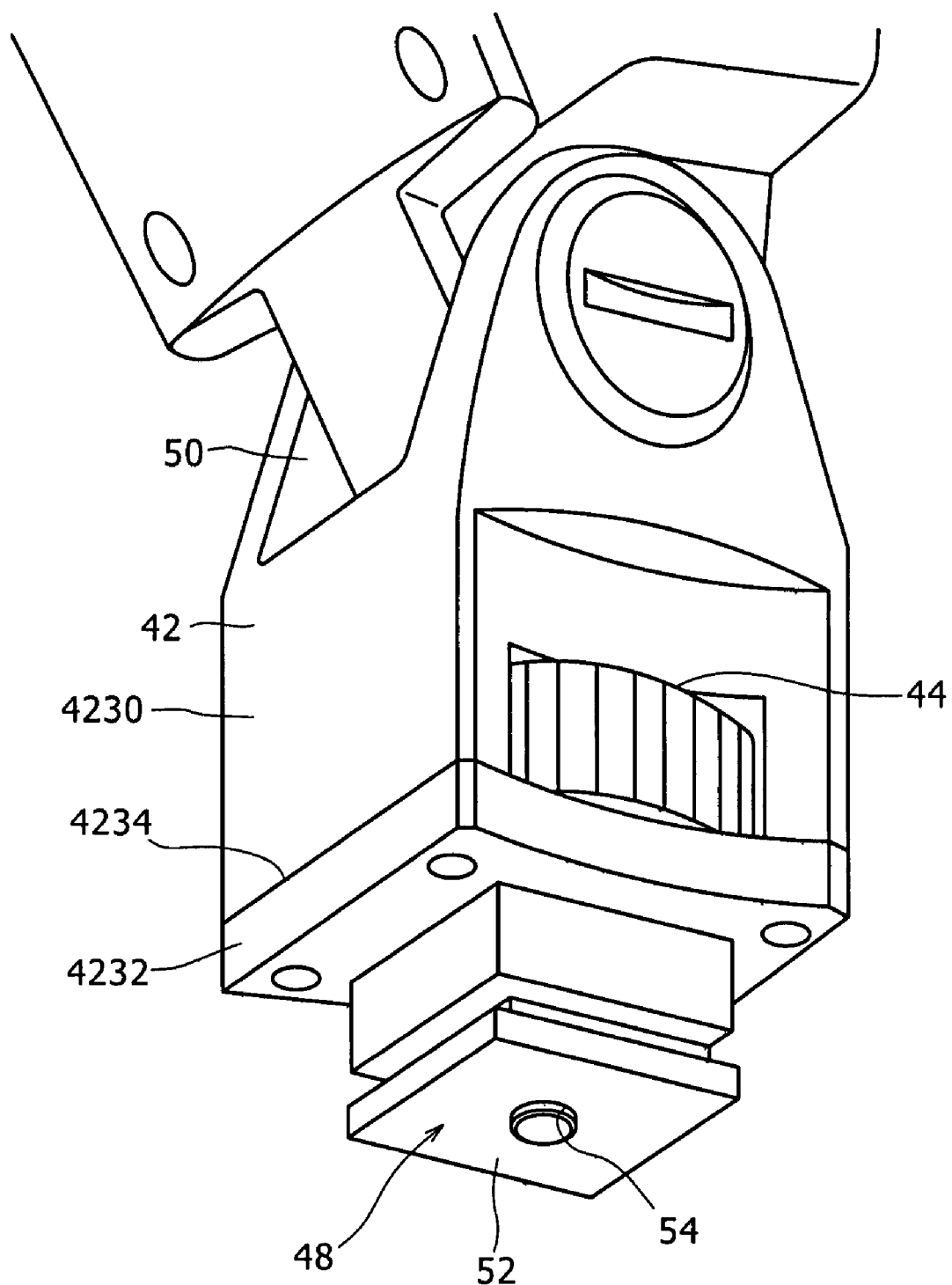
FIG. 16 is a perspective view of the accessory attaching device in the state where the externally threaded member is positioned in the intermediate position between the retracted position and the extended position.
Figure 17:
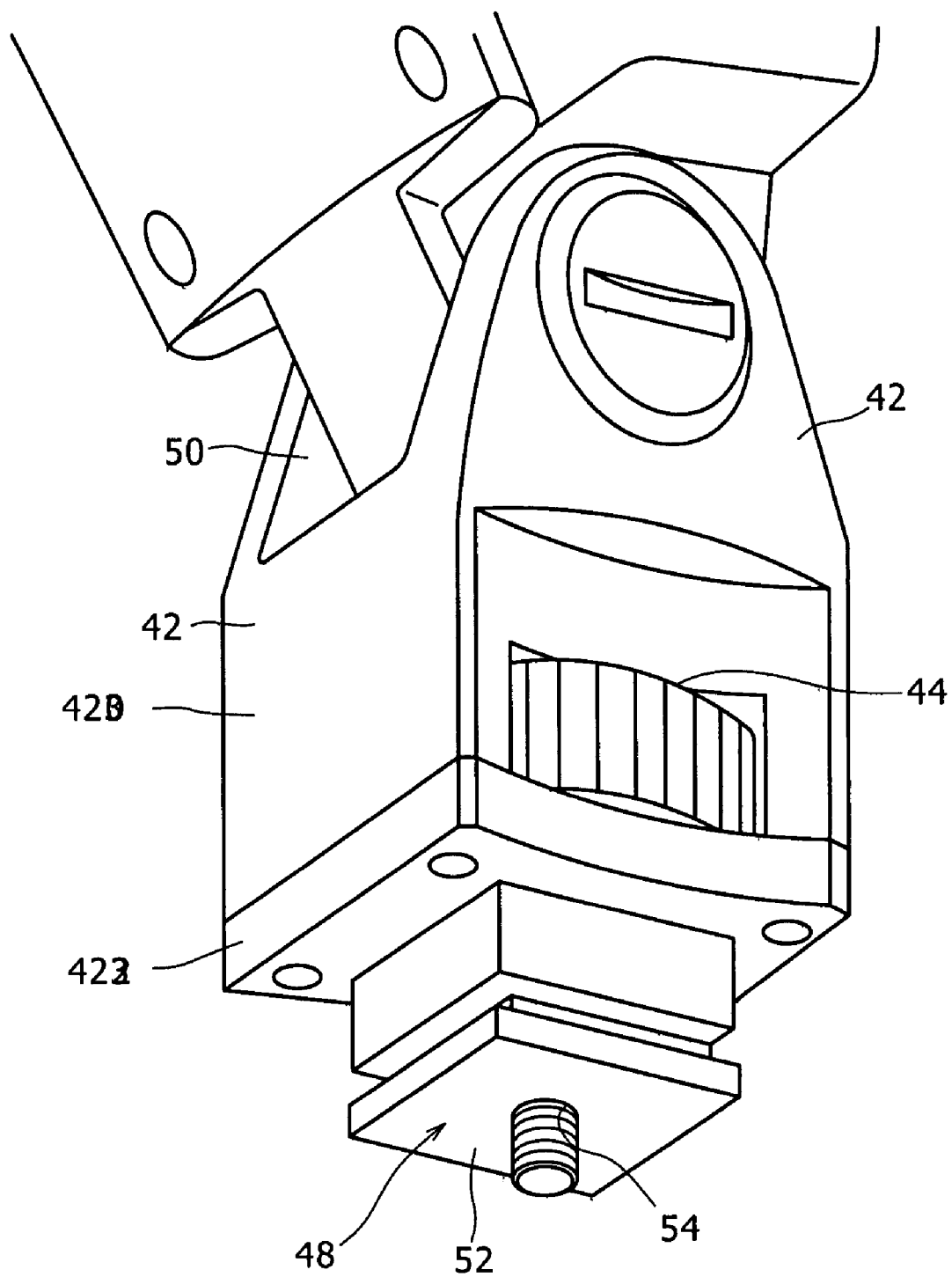
FIG. 17 is a perspective view of the accessory attaching device in the state where the externally threaded member is positioned in the extended position.

FIG. 15 is a perspective view of the accessory attaching device 40 in the state where the externally threaded member 46 is positioned in the retraction position. FIG. 16 is a perspective view of the accessory attaching device 40 in the state where the externally threaded member 46 is positioned in an intermediate position between the retraction position and the extension position. FIG. 17 is a perspective view of the accessory attaching device 40 in the state where the externally threaded member is positioned in the extension position.

With reference to FIGS. 9 to 11, the accessory attaching device 40 includes, for example, a housing 42, a rotationally operable ring 44, and an externally threaded member 46. The rotationally operable ring 44 and the externally threaded member 46 are built-in in the housing 42.

The housing 42 has, in portions opposite one another, an accessory-side apparatus detachably attaching portion 48 detachably attachable to an apparatus-side detachably attaching portion of an apparatus, such as an electronic apparatus or tripod, and an accessory attaching portion 50 for attachment of an accessory, such as the microphone 70 or video light 72 described above.

In the present embodiment, the apparatus-side detachably attaching portion of the apparatus, such as the electronic apparatus or tripod, corresponds to any one of the apparatus-side detachably attaching portion 22 of the video camera 10 shown in FIGS. 1 and 2; the apparatus-side detachably attaching portion 26 of the image capture apparatus 24 shown in FIGS. 3 and 4; the apparatus-side detachably attaching portion 30 of the tripod 28 shown in FIG. 5; and the apparatus-side detachably attaching portion 34 of the grip 32 shown in FIG. 6.

The accessory-side apparatus detachably attaching portion 48 includes a flat attachment/detachment surface 52 that extends over a plane perpendicular to the direction of connection between the accessory-side apparatus detachably attaching portion 48 and the accessory attaching portion 50.

The attachment/detachment surface 52 has a rectangular shape.

As shown in FIG. 9, the accessory-side apparatus detachably attaching portion 48 includes the attachment/detachment surface 52, a pair of lateral surfaces 5302, and a pair of grooves 5306. The lateral surfaces 5302, respectively, elevate at right angles from one pair of sides of two pairs of sides, which are opposite one another, of the attachment/detachment surface 52. The grooves 5306, respectively, extends through the pair of lateral surfaces 5302 along the direction of one pair of sides and respectively elevating at right angles from the other pair of sides of the two pairs of sides.

An internally threaded portion 54 is provided in a portion of the housing 42 constituting the accessory-side apparatus detachably attaching portion 48. The internally threaded portion 54 extends perpendicular to the attachment/detachment surface 52 and is open in the center of the attachment/detachment surface 52.

With reference to FIGS. 12 to 14, a spacing 56 in communication with the internally threaded portion 54 is provided inside the housing 42.

The rotationally operable ring 44 is disposed in such a manner that a central portion thereof is positioned along the spacing 56. Thereby, the rotationally operable ring 44 is supported by the housing 42 to be immobilizable along an axial direction of the internally threaded portion 54 and rotatable about an axial center of the internally threaded portion 54.

With reference to FIG. 12, a cylindrical wall 4202 of the housing 42 and a recess portion 4402 in an inner circumferential portion of the rotationally operable ring 44 are connected together to be rotatable. Thus, the rotationally operable ring 44 is supported by the housing 42 to be rotatable about the axial center of the internally threaded portion 54.

With reference to FIGS. 9 and 12, respective recess portions 4204 recessed toward the axial center of the internally threaded portion 54 are provided in portions of an outer face of the housing 42. The portions of the outer face are positioned opposite one another along the direction perpendicular to the axial center of the internally threaded portion 54. The outer circumferential portion of the rotationally operable ring 44 is exposed outwardly of the housing 42 from the recess portions 4204, thereby enabling rotation (or, a rotational operation).

The externally threaded member 46 is disposed on the axial center of the internally threaded portion 54 in the spacing 56, in which, in a central portion of the rotationally operable ring 44, the externally threaded member 46 is movable along the axial direction of the internally threaded portion 54 and includes a longitudinal part coupled to the rotationally operable ring 44 to be integrally rotatable with the rotationally operable ring 44 about the axial center of the internally threaded portion 54.

With reference to FIG. 11, the externally threaded member 46 includes a disc-shaped head portion 4602, an axial portion 4604 protruding from the head portion 4602 and having an elliptical (non-circular) cross section, and an externally threaded portion 4606 provided on the axial center of the axial portion 4604.

An engagement hole 4402 having an elliptical (not circular) cross section is formed in the center of the rotationally operable ring 44. While the rotationally operable ring 44 rotates integrally with the axial portion 4604, the axial portion 4604 engages the engagement hole 4402 to be movable along the axial direction of the internally threaded portion 54. By the engagement of the axial portion 4604 with the engagement hole 4402, the externally threaded member 46 is coupled to be movably in the axial direction of the internally threaded portion 54 and to be rotatable integrally with the rotationally operable ring 44 about the axial center of the internally threaded portion 54.

With reference to FIGS. 12 and 15, the externally threaded portion 4606 of the externally threaded member 46 is extracted from the internally threaded portion 54 by a rotational operation of the rotationally operable ring 44 along one direction, whereby the externally threaded member 46 is positioned in a retraction position.

More specifically, the retraction position is a position of the externally threaded member 46, in which a lead end of the externally threaded portion 4606 engages with an end portion of the internally threaded portion 54, which end portion is positioned opposite the attachment/detachment surface 52.

Alternately, with reference to FIGS. 14 and 17, the externally threaded portion 4606 of the externally threaded member 46 is meshed or engaged with the internally threaded portion 54 by a rotational operation of the rotationally operable ring 44 along the opposite or reverse direction with respect to the above-described one direction of the rotationally operable ring 44. Thereby, the externally threaded member 46 is positioned in an extension position in which the lead end portion of the externally threaded member 46 extends from the attachment/detachment surface 52.

The spacing 56 includes a coiled spring 60 that urges the externally threaded member 46, which is positioned in the extension position, toward the retraction position.

More specifically, the coiled spring 60 is provided around the axial portion 4604. As shown in FIG. 14, when the externally threaded member 46 is positioned in the extension position, the coiled spring 60 is compressed by the head portion 4602 of the externally threaded member 46 and a flange of the rotationally operable ring 44. Thereby, the coiled spring 60 urges the externally threaded member 46 toward the retraction position.

Further, referring to FIG. 12, the spacing 56 includes a stopper 62 that contacts with the externally threaded member 46. The stopper 62 contacts with the externally threaded member 46 in the direction of movement from the extension position to the retraction position, thereby to define the retraction position. The stopper 62 is configured of a wall face of the housing 42 in a deep-side portion of the spacing 56, which portion opposes the internally threaded portion 54.

As shown in FIGS. 15 to 17, the housing 42 is constructed in the manner that upper and lower split bodies 4230 and 4232 vertically split in a portion where the rotationally operable ring 44 is disposed are coupled together by screwing. In FIG. 15, numeral 4234 denotes a coupling plane between the upper and lower split bodies 4230 and 4232.

With reference to FIG. 9, the accessory attaching portion 50 includes, for example, flanges 5002 opposing one another and bolt insertion holes 5004 coaxially provided with the flanges 5002.

For the construction of the accessory attaching portion 50 is not limited thereto, but suitable one of various types of constructions are employed corresponding to the types of accessories, such as the microphone 70 and the video light 72; and suitable one of various types of already known constructions can be employed for the accessory attaching portion 50.

In the case that, for example, the accessory is, for example, the microphone 70 as shown in FIG. 7, the accessory attaching device 40 can be preliminarily integrated with a microphone body (housing of the microphone 70, or accessory body). In this case, the accessory attaching portion 50 is omitted or not provided. More specifically, the accessory-side apparatus detachably attaching portion 48, which is attachable or detachable on the apparatus-side detachably attaching portion 26, is provided in a portion positioned opposite a portion of the housing 42 in which the accessory attaching device 40 is integrated with the microphone body (accessory body).

The accessory-side apparatus detachably attaching portion 48 includes the attachment/detachment surface 52. The attachment/detachment surface 52 extends over a plane perpendicular to a direction connecting together the portion of the housing 42, which portion is integrated with the microphone body (accessory body), and the accessory-side apparatus detachably attaching portion 48. Other construction portions are similar to those of the construction of the accessory attaching device 40 provided separately from the accessory.

Using methods for the accessory of the present embodiment will be described herebelow.

As a first example, referring to FIG. 7, the following describes a case where the microphone 70, which is one of the accessories of the present embodiment, is attached to the apparatus-side detachably attaching portion 26 shown in FIGS. 3 and 4.

In this case, as shown in FIGS. 12 and 15, the externally threaded member 46 is preliminarily positioned in the retraction position. With this state being maintained, the attachment/detachment surface 52 of the accessory-side apparatus detachably attaching portion 48 is pressed or pushed onto the upper surface 2602 of the seating 26A of the apparatus-side detachably attaching portion 26 shown in FIG. 4.

Subsequently, as shown in FIGS. 14 and 17, the rotationally operable ring 44 is rotated in the other direction, whereby the externally threaded member 46 is rotationally moved toward the extension position. Thereby, the externally threaded portion 4606 is engaged with the internally threaded portion 26B of the apparatus-side detachably attaching portion 26. Further, the rotationally operable ring 44 is rotated in the other direction, and the externally threaded portion 4606 is rotated. Thereby, the upper surface 2602 of the seating 26A is coupled with the attachment/detachment surface 52 of the accessory-side apparatus detachably attaching portion 48.

In the manner described above, the accessory or microphone 70 is attached to the apparatus-side detachably attaching portion 26, as shown in FIG. 7.

For detaching the accessory or microphone 70 from the apparatus-side detachably attaching portion 26, the rotationally operable ring 44 is rotated in one direction. Thereby, the externally threaded member 46 is rotationally moved to the retraction position from the extension position. As a consequence, the externally threaded portion 4606 is disengaged from the internally threaded portion 26B, whereby the microphone 70 can be detached from the apparatus-side detachably attaching portion 26.

As another example, with reference to FIG. 8, a case where the video light 72, which is one of the accessories of the present embodiment, is attached to the apparatus-side detachably attaching portion 34 shown in FIG. 6 will be described herebelow.

In this case, as shown in FIGS. 12 and 15, the externally threaded member 46 is preliminarily positioned in the retraction position, and the internally threaded portion 54 is put on the lead end of the externally threaded portion 34B. With this state being maintained, the ring 34C is rotated in one direction, whereby the externally threaded portion 34B is engaged with the internally threaded portion 54.

Thereby, the attachment/detachment surface 52 of the apparatus attaching/detaching portion 48 is pressed onto the attachment surface 32B of the attaching/detaching portion 34.

In the manner described above, the accessory or video light 72 is attached to the apparatus-side detachably attaching portion 34, as shown in FIG. 8.

Similarly, the accessory can be attached to or detached from the tripod 28 including the attaching/detaching portion 34 having the externally threaded portion 30D shown in FIG. 5 in the manner that the externally threaded portion 30D is engaged with or disengaged from the internally threaded portion 54.

A case where the accessory an accessory is attached to the apparatus-side detachably attaching portion 22 shown in FIGS. 1 and 2 will be described herebelow.

In this case, as shown in FIGS. 12 and 15, the externally threaded member 46 is preliminarily positioned in the retraction position, and the accessory-side apparatus detachably attaching portion 48 is inserted between the two engagement walls 22C of the apparatus-side detachably attaching portion 22 shown in FIG. 2. Then, the edges of the engagement walls 22C, respectively, are engaged with the grooves 5306 of the accessory-side apparatus detachably attaching portion 48, whereby the accessory-side apparatus detachably attaching portion 48 is pressed onto the wall portion 22D.

Subsequently, as shown in FIGS. 13 and 16, the rotationally operable ring 44 is rotated in the other direction to thereby move a lead end portion of the externally threaded portion 4606 of the externally threaded member 46 in the direction along which the lead end portion of the externally threaded portion 4606 extends from the attachment/detachment surface 52. Thereby, the lead end portion of the externally threaded portion 4606 is pressed onto the upper surface of the apparatus-side detachably attaching portion 22.

Thereby, the engagement walls 22C of the apparatus-side detachably attaching portion 22 and the grooves 5306 of the accessory-side apparatus detachably attaching portion 48 are, respectively, engaged with one another, and the engagement between the apparatus-side detachably attaching portion 22 and the accessory-side apparatus detachably attaching portion 48 is caused into a locked state, whereby the accessory is attached to the apparatus-side detachably attaching portion 22.

For detaching the accessory from the apparatus-side detachably attaching portion 22, the rotationally operable ring 44 is rotated in the one direction to release the locked state. As a consequence, the grooves 5306 of the accessory-side apparatus detachably attaching portion 48 are disengaged from the respective engagement walls 22C of the apparatus-side detachably attaching portion 22 (whereby the accessory can be detached from the apparatus-side detachably attaching portion 22).

As described above, the present or first embodiment is an accessory to be detachably attached an apparatus-side detachably attaching portion of an apparatus. The accessory includes the accessory-side apparatus detachably attaching portion 48 that is detachably attached to the apparatus-side detachably attaching portion of the apparatus. The accessory-side apparatus detachably attaching portion 48 includes the attachment/detachment surface 52; the internally threaded portion 54 open on the attachment/detachment surface 52; and the externally threaded member 46 disposed in engagement with the internally threaded portion 54 to be rotatable. By the rotational operation of the externally threaded member 46 along the one direction, the externally threaded member 46 is positioned in the retraction position. In the retraction position, the lead end portion of the externally threaded portion 4606 of the externally threaded member 46 is retracted into the internally threaded portion 54, and the internally threaded portion 54 is exposed on the attachment/detachment surface 52. Alternately, by the rotational operation of the externally threaded member 46 along the direction opposite the one direction, the externally threaded member 46 is positioned in the extension position. In the extension position, the lead end portion of the externally threaded portion 4606 extends from the attachment/detachment surface 52.

Thus, the accessory-side apparatus detachably attaching portion 48 of the present embodiment is constructed by using the internally threaded portion 54 and the externally threaded member 46, such that the accessory can be detachably attached to any one of a plurality of apparatus-side detachably attaching portions without using an adaptor.

Consequently, the accessory attachment/detachment operation thus simplified can be implemented, and cost increases associated with the use of adaptors as in the previously proposed case can be restrained. Further, management time and labor necessary, for example, to prevent various adaptors from being lost can be eliminated. Consequently, effects advantageous for improving the usability of the accessory can be provided.

Second Embodiment

A second embodiment will be described herebelow.

Figure 18:
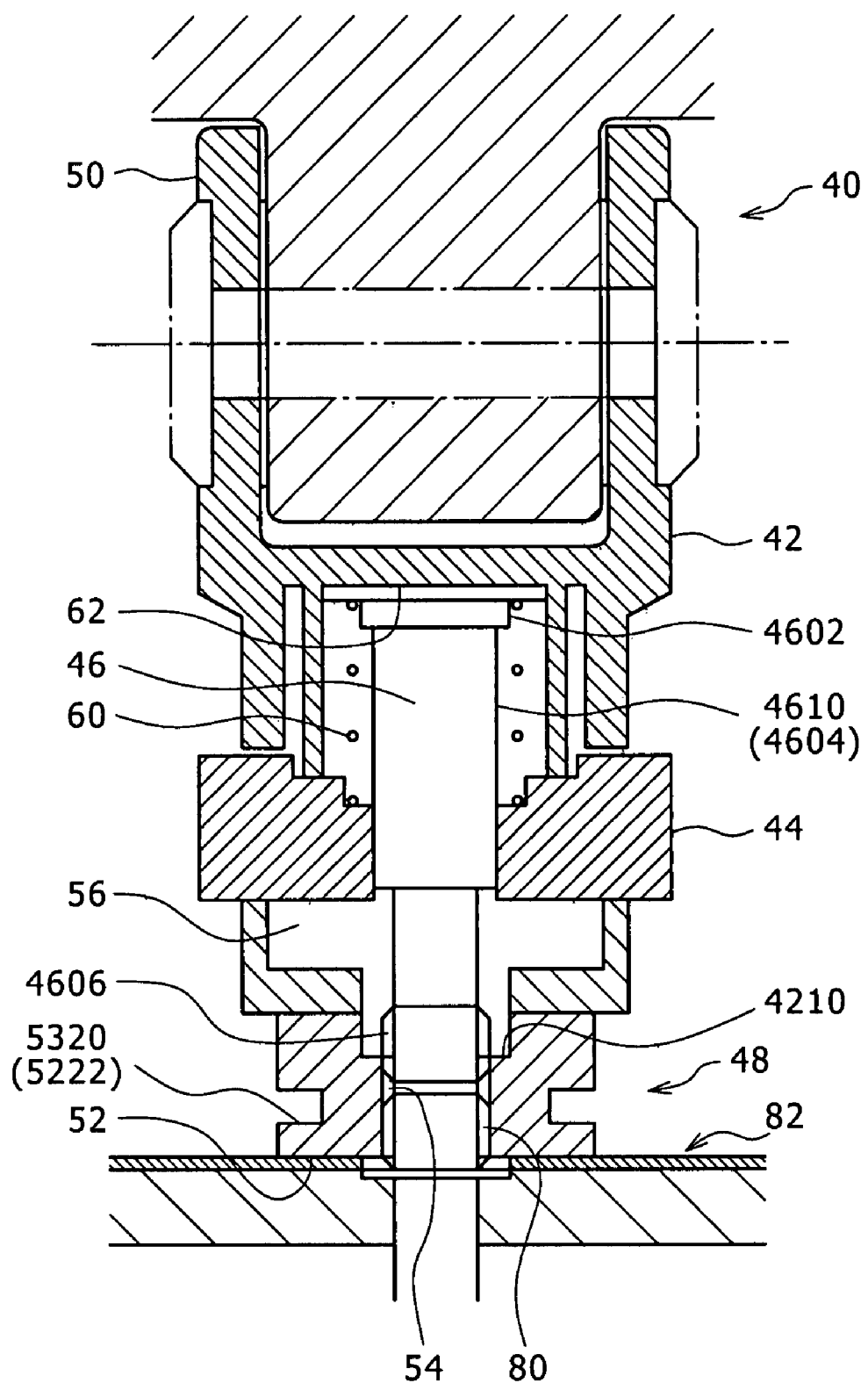
FIG. 18 is a cross sectional view of the accessory attaching device in the state where the externally threaded member is positioned in the retracted position.
Figure 19:
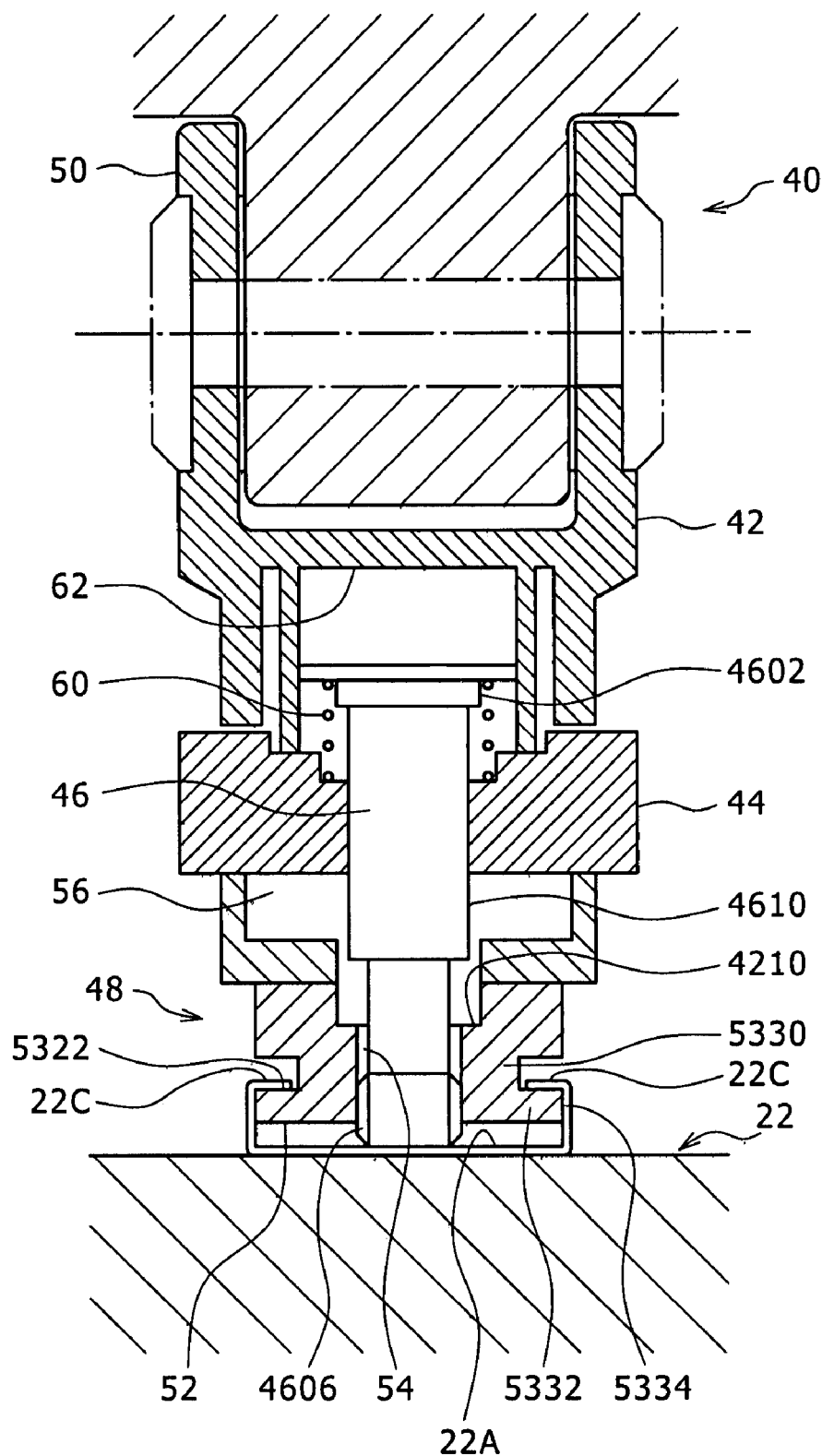
FIG. 19 is a cross sectional view of the accessory attaching device in the state where the externally threaded member is positioned in the intermediate position between the retracted position and the extended position.
Figure 20:
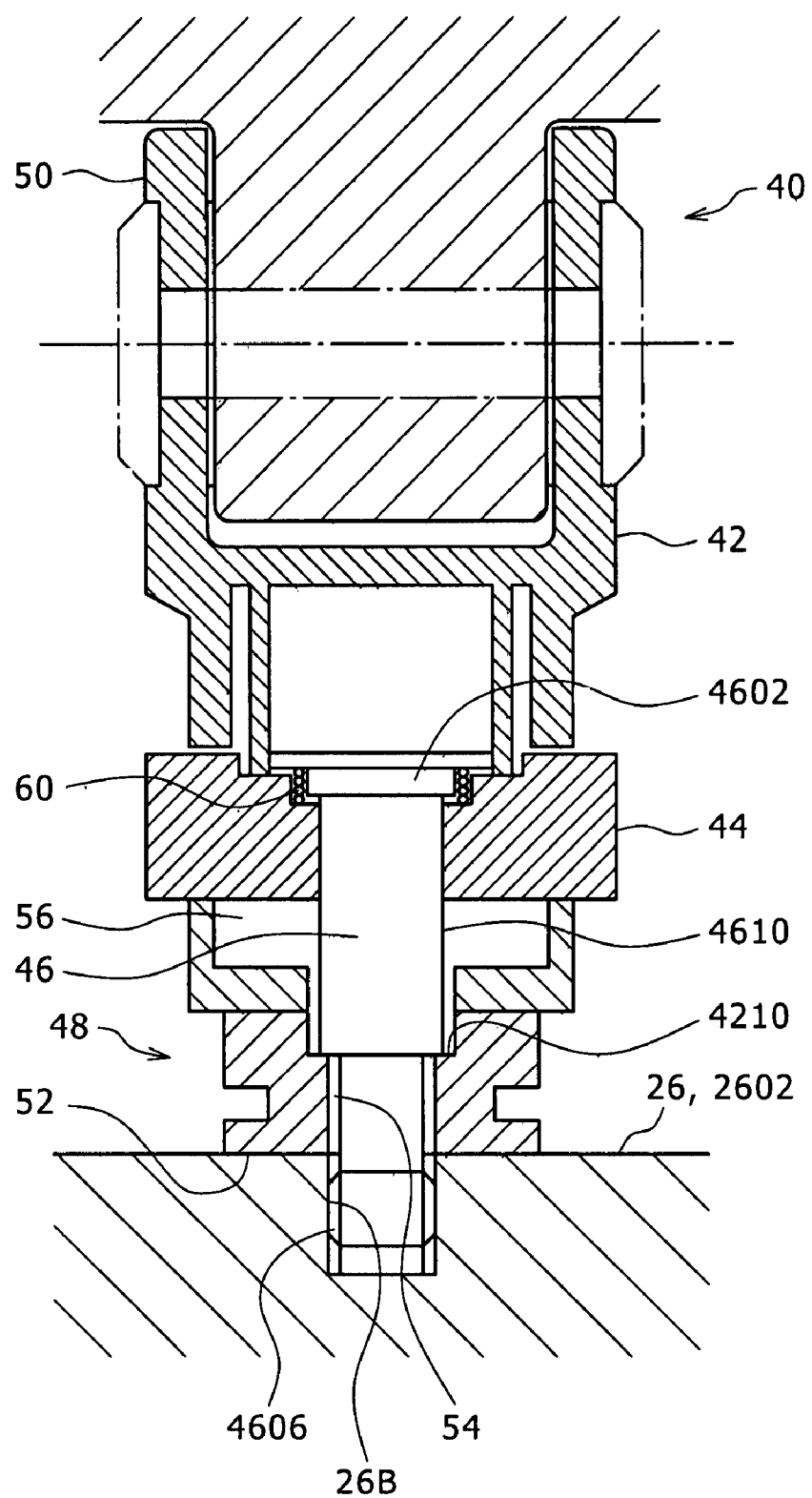
FIG. 20 is a cross sectional view of the accessory attaching device in the state where the externally threaded member is positioned in the extended position.

FIG. 18 is a cross sectional view of the accessory attaching device 40 in the state where the externally threaded member 46 is positioned in the retracted position. FIG. 19 is a cross sectional view of the accessory attaching device 40 in the state where the externally threaded member 46 is in the intermediate position between the retracted position and the extended position. FIG. 20 is a cross sectional view of the accessory attaching device 40 in the state where the externally threaded member 46 is positioned in the extended position.

The second embodiment is identical or similar to the first embodiment, except for the externally threaded member 46 and the accessory-side apparatus detachably attaching portion 48 that are partly different in shape from those of the first embodiment. In relevant drawings and in descriptions below, the same numerals designate the same portions as those in the first embodiment, and detailed or repetitious descriptions of the respective identical portions are omitted herefrom.

With reference to FIGS. 18 to 20, similarly as in the first embodiment, the accessory attaching device 40 includes, for example, a housing 42, a rotationally operable ring 44, and an externally threaded member 46, in which the rotationally operable ring 44 and the externally threaded member 46 are built-in in the housing 42.

The housing 42 has, in portions opposite one another, an accessory-side apparatus detachably attaching portion 48 detachably attachable to an apparatus-side detachably attaching portion of an apparatus, such as an electronic apparatus or tripod, and an accessory attaching portion 50 for attachment of an accessory, such as the microphone 70 or video light 72 shown in FIGS. 7 and 8.

The accessory-side apparatus detachably attaching portion 48 includes an attachment/detachment surface 52 and recess portions 5320.

The attachment/detachment surface 52 has a rectangular shape. The recess portions 5320 are provided parallel to one another in portions of the housing 42, which portions are opposite to one another and are close to the attachment/detachment surface 52. With the recess portions 5320, engagement faces 5322 directed to be spaced apart from the attachment/detachment surface 52 is formed in a wall portion of the attachment/detachment surface 52, which portion includes the attachment/detachment surface 52.

An internally threaded portion 54 is provided in a portion of the housing 42 constituting the accessory-side apparatus detachably attaching portion 48. The internally threaded portion 54 extends perpendicular to the attachment/detachment surface 52 and is open in the center of the attachment/detachment surface 52.

In other words, the accessory-side apparatus detachably attaching portion 48 includes a central wall portion 5330 and two extending wall portions 5332. The central wall portion 5330 includes the internally threaded portion 54 and extends along the axial direction of the internally threaded portion 54. The extending wall portions 5332, respectively, extend along the lateral direction at the same thickness from two sides of end portions of the central wall portion 5330 in the extension direction.

The attachment/detachment surface 52 includes an end face of the central wall portion 5330 in which the internally threaded portion 54 is open and one-side faces of the two extending wall portions 5332 in the thickness direction. The other-side faces of the extending wall portions 5332 in the thickness direction are used as the engagement faces 5322 extending in parallel to one another in the opposite direction of the attachment/detachment surface 52. Ends of the two extending wall portions 5332 in the extension directions are respectively used as guide surfaces 5334 that extend perpendicular to the attachment/detachment surface 52 and parallel to one another. The shape of the attachment/detachment surface 52 is not limited to the rectangle, but any of various shapes can be employed.

With reference to FIG. 18 (or FIG. 12), in the state the externally threaded member 46 is positioned in the retraction position, the depth of the internally threaded portion 54 exposed to the attachment/detachment surface 52 from the attachment/detachment surface 52 is a dimension sufficient for engagement of a camera attaching screw 80 (corresponding to the externally threaded portion 30D, 34B (shown in FIGS. 5 and 6) provided to the apparatus for attaching the camera) with the internally threaded portion 54 to thereby support the accessory to the apparatus-side detachably attaching portion of the apparatus.

As has been known, the relevant ISO (International Organization for Standardization) standard (ISO 1222) specifies that the length of camera installation screw 80 is 4.5 mm±0.2 mm. Accordingly, the depth of the internally threaded portion 54 for engagement with the camera attaching screw 80 has to be larger than or equal to 4.7 mm, which is a maximum value specified by the standard (ISO 1222).

Similarly as in the first embodiment described above, the externally threaded member 46 is disposed on the axial center of the internally threaded portion 54 in the spacing 56, in which, in a central portion of the rotationally operable ring 44, the externally threaded member 46 is movable along the axial direction of the internally threaded portion 54 and includes a longitudinal part coupled to the rotationally operable ring 44 to be integrally rotatable with the rotationally operable ring 44 about the axial center of the internally threaded portion 54.

With reference to FIG. 20, in the state the externally threaded member 46 is positioned in the extension position, the length from the attachment/detachment surface 52 to the lead end of the externally threaded member 46 is a dimension sufficient to allow that the externally threaded portion 4606 is engaged with the externally threaded portion provided to the apparatus and the accessory is securely and stably supported by the apparatus-side detachably attaching portion of the apparatus.

A large-diameter portion 4610 larger in diameter than the externally threaded portion 4606 is provided in a midway portion of the externally threaded member 46 in the longitudinal direction. More specifically, the large-diameter portion 4610 is provided in a midway portion of the axial portion 4604.

Further, with reference to FIG. 20, an anchoring portion 4210 is provided in a portion of the housing 42 below the spacing 56. The anchoring portion 4210 engageably stops an end portion of the large-diameter portion 4610 of the externally threaded member 46 on the side of the externally threaded portion 4606, thereby defining a maximum extension position where the lead end portion of the externally threaded member 46 is maximally extended from the attachment/detachment surface 52.

Using methods for the accessory of the present embodiment will be described herebelow.

As a first example, referring to FIG. 18, a case where the camera attaching screw 80 is provided to an apparatus-side detachably attaching portion 82 on the side of the apparatus (camera) will be described herebelow.

In this case, the externally threaded member 46 is preliminarily positioned in the retraction position. With this state being maintained, the internally threaded portion 54 of the accessory-side apparatus detachably attaching portion 48 is put on the lead end of the camera attaching screw 80. Then, with this state being maintained, the camera attaching screw 80 is rotated in the one direction, whereby the camera attaching screw 80 is engaged with the internally threaded portion 54.

Thereby, the attachment/detachment surface 52 of the accessory-side apparatus detachably attaching portion 48 is pressed onto the attachment surface of the apparatus-side detachably attaching portion 82, whereby the accessory-side apparatus detachably attaching portion 48 is coupled with the apparatus-side detachably attaching portion 82.

In the manner described above, the accessory is attached to the apparatus-side detachably attaching portion 82.

For detaching the accessory from the apparatus-side detachably attaching portion 82, the camera attaching screw 80 is rotated in the opposite direction. Thereby, the camera attaching screw 80 is disengaged from the internally threaded portion 54, and hence the accessory is detached from the apparatus-side detachably attaching portion 82.

As another example, a case where an accessory is attached to the apparatus-side detachably attaching portion 22 formed from the accessory shoe (shown in FIG. 2) will be described herebelow with reference to FIG. 19.

In this case, as shown in FIG. 18, the externally threaded member 46 is preliminarily positioned in the retraction position. Then, with this state being maintained, the apparatus-side detachably attaching portion 22 and the accessory-side apparatus detachably attaching portion 48 are relatively slid, whereby the two engagement walls 22C of the apparatus-side detachably attaching portion 22 are engaged with the engagement faces 5322 on the two sides.

Subsequently, the rotationally operable ring 44 is rotated in the other direction, and the lead end portion of the externally threaded portion 4606 of the externally threaded member 46 is moved thereby in the direction along which the lead end portion of the externally threaded portion 4606 of the externally threaded member 46 extends from the attachment/detachment surface 52. Thereby, the lead end portion of the externally threaded portion 4606 is pressed onto the upper surface of the bottom 22A of the apparatus-side detachably attaching portion 22.

In this manner, the engagement walls 22C and the engagement faces 5322 are, respectively, press contacted with one another, and hence the accessory is attached to the apparatus-side detachably attaching portion 22.

For detaching the accessory from the apparatus-side detachably attaching portion 22, the rotationally operable ring 44 is rotated in the one direction, and the externally threaded member 46 is rotationally moved thereby to the retraction position. Thereby, press contact between the respective engagement walls 22C and the respective engagement faces 5322 is released, and the apparatus-side detachably attaching portion 22 and the accessory-side apparatus detachably attaching portion 48 are relatively slid. As a consequence, the accessory-side apparatus detachably attaching portion 48 is disengaged from the accessory-side apparatus detachably attaching portion 48 (whereby the accessory can be detached from the apparatus-side detachably attaching portion 22).

Another example case will be described herebelow with reference to FIG. 20, in which an accessory is attached to the apparatus-side detachably attaching portion 26 shown in FIGS. 3 and 4.

In this case, as shown in FIG. 18, the externally threaded member 46 is either preliminarily positioned in the retraction position or is preliminarily is positioned so that the lead end thereof is positioned in the vicinity of the attachment/detachment surface 52. Then, with this state being maintained, the attachment/detachment surface 52 of the accessory-side apparatus detachably attaching portion 48 is pressed onto the upper surface 2602 of the apparatus-side detachably attaching portion 26.

Subsequently, the rotationally operable ring 44 is rotated in the other direction. Thereby, the externally threaded member 46 is rotationally moved along the extension position, whereby the externally threaded portion 4606 is engaged with the internally threaded portion 26B of the apparatus-side detachably attaching portion 26. Further, the rotationally operable ring 44 is rotated in the other direction, and the externally threaded portion 4606 is rotated thereby. As a consequence, the upper surface 2602 and the attachment/detachment surface 52 of the accessory-side apparatus detachably attaching portion 48 are coupled together.

More specifically, the end portion of externally threaded member 46 on the side of the externally threaded portion 4606 of the large-diameter portion 4610 is brought into contact with one another, whereby a portion of the housing 42 is clamped between the large-diameter portion 4610 and the upper surface 2602. As a consequence, the upper surface 2602 and the attachment/detachment surface 52 of the accessory-side apparatus detachably attaching portion 48 are coupled together.

In the manner described above, the accessory is attached to the apparatus-side detachably attaching portion 26.

For detaching the accessory from the apparatus-side detachably attaching portion 26, the rotationally operable ring 44 is rotated in the one direction. Thereby, the externally threaded member 46 rotationally moved to the retraction position from the extension position, and consequently, the accessory is detached from the apparatus-side detachably attaching portion 26.

Similarly as in the first embodiment, in the second embodiment, the accessory attachment/detachment operation thus simplified can be implemented, and cost increases associated with the use of adaptors as in the previously proposed case. Further, management time and labor necessary, for example, to prevent various adaptors from being lost can be eliminated. Consequently, effects advantageous for improving the usability of the accessory can be provided.

As above, the respective embodiment and example have been described with reference to the cases where the apparatuses to which the accessories are attached are the video camera, tripod, and grip. However, the apparatuses to which the accessories of the present invention can be attached are not limited to the above-described apparatuses, but may be various types of electronic apparatuses, such as digital still cameras and film-using cameras.

Further, many other variations and modifications and other uses will become apparent to those skilled in the art. Accordingly, the present invention is not to be limited by the specific description herein, but only by the appended claims.

What is claimed is:

1. An accessory to be detachably attached to an apparatus-side detachably attaching portion of an apparatus, the accessory comprising:
    an accessory-side apparatus detachably attaching portion to be attached to the apparatus-side detachably attaching portion,
    the accessory-side apparatus detachably attaching portion including an attachment/detachment surface,
    an internally threaded portion open on the attachment/detachment surface, and
    an externally threaded member to be rotatably engaged with the internally threaded portion,
    wherein the externally threaded member is positioned either in a retraction position by rotation of the externally threaded member in one direction or in an extension position by rotation of the externally threaded member in an other direction opposite to the one direction, the retraction position being a position wherein a lead end portion of the externally threaded portion of the externally threaded member is retracted into the internally threaded portion and the externally threaded portion is exposed on the attachment/detachment surface, and the extension position being a position wherein the lead end portion of the externally threaded member is extended from the attachment/detachment surface,
    wherein the accessory-side apparatus detachably attaching portion further includes a central wall portion and two extending wall portions, the central wall portion including the internally threaded portion and extending along the axial direction of the internally threaded portion, the two extending wall portions respectively extending along a lateral direction at a same thickness from two sides of end portions of the central wall portion in the extension direction,
    wherein the attachment/detachment surface includes an end face of the central wall portion wherein the internally threaded portion is open and one-side faces of the two extending wall portions in a thickness direction,
    wherein other-side faces of the extending wall portions in the thickness direction are used as engagement faces extending in parallel to one another in an opposite direction of the attachment/detachment surface, and
    wherein ends of the two extending wall portions in extension directions are respectively used as guide surfaces extending perpendicular to the attachment/detachment surface and parallel to one another.

2. An accessory as claimed in claim 1, wherein the accessory-side apparatus detachably attaching portion further includes a rotationally operable ring for rotating the externally threaded member,
wherein the rotationally operable ring is supported by a housing of the apparatus to be immobilizable along a direction of an axial direction of the externally threaded member; and
wherein the externally threaded member is coupled to the rotationally operable ring to be movable along the axial direction of the externally threaded member and to be integrally rotatable with the rotationally operable ring about the axial direction of the externally threaded member.

3. An accessory as claimed in claim 1, further comprising an accessory body and an accessory attaching device, the accessory attaching device including the accessory-side apparatus detachably attaching portion and an accessory attaching portion for attaching the accessory attaching device to the accessory body.

4. An accessory as claimed in claim 3, wherein the accessory attaching portion is integral with the accessory body.

5. An accessory attaching device, comprising:
a housing;
a rotationally operable ring built-in in the housing;
an externally threaded member built-in in the housing; and
an accessory-side apparatus detachably attaching portion detachably attachable to an apparatus-side detachably attaching portion of an apparatus, and an accessory attaching portion for attaching an accessory, in mutually opposite portions of the housing,
wherein the accessory-side apparatus detachably attaching portion includes an attachment/detachment surface extending over a plane perpendicular to a direction connecting together the accessory-side apparatus detachably attaching portion and the accessory attaching portion;
wherein a portion of the housing constituting the accessory-side apparatus detachably attaching portion includes an internally threaded portion extending perpendicular to the attachment/detachment surface and open on the attachment/detachment surface;
wherein an interior portion of the housing includes a spacing in communication with the internally threaded portion;
wherein the rotationally operable ring is supported by the housing, with a central portion positioned in the spacing, to be immobilizable along an axial direction of the internally threaded portion and to be rotatable about an axial center of the internally threaded portion;
wherein the externally threaded member is disposed on the axial center of the internally threaded portion in the spacing,
wherein, in a central portion of the rotationally operable ring, the externally threaded member is movable along the axial direction of the internally threaded portion and includes a longitudinal part coupled to the rotationally operable ring to be integrally rotatable with the rotationally operable ring about the axial center of the internally threaded portion; and
wherein the externally threaded member is positioned either in a retraction position by rotation of the externally threaded member in one direction or in an extension position by rotation of rotationally operable ring in an other direction opposite to the one direction, the retraction position being a position wherein the externally threaded portion of the externally threaded member is retracted from the internally threaded portion, and the extension position being a position wherein the externally threaded portion of the externally threaded member engaged with the internally threaded portion and a lead end portion of the externally threaded portion is extended from the attachment/detachment surface; and
a spring in the spacing, the spring urging toward the retraction position the externally threaded member positioned in the extension position.

6. An accessory attaching device as claimed in claim 5,
wherein the retraction position is a position of the externally threaded member,
wherein a lead end of the externally threaded portion engages with an end portion of the internally threaded portion, the end portion being positioned opposite the attachment/detachment surface.

7. An accessory attaching device as claimed in claim 5, further comprising a stopper for contacting with the externally threaded member and for contacting with the externally threaded member in the direction of movement from the extension position to the retraction position, thereby to define the retraction position.

8. An accessory attaching device as claimed in claim 5, further comprising recess portions respectively recessed toward the axial center of the internally threaded portion in portions of an outer face of the housing, the portion being positioned opposite one another along a direction perpendicular to the axial center of the internally threaded portion, wherein an outer circumference portion of the rotationally operable ring is exposed outwardly of the housing from the recess portions.

9. An accessory attaching device as claimed in claim 5, further comprising a large-diameter portion larger in diameter than the externally threaded portion in a midway portion of the externally threaded member in a longitudinal direction; and
an anchoring portion in the housing, the anchoring portion engageably stopping an end portion of the large-diameter portion on the side of the externally threaded portion, thereby to define a maximum extension position where the lead end portion of the externally threaded member is maximally extended from the attachment/detachment surface.

10. An accessory attaching device, comprising:
a housing;
a rotationally operable ring built-in in the housing;
an externally threaded member built-in in the housing;
an accessory-side apparatus detachably attaching portion detachably attachable to an apparatus-side detachably attaching portion of an apparatus, and an accessory attaching portion for attaching an accessory, in mutually opposite portions of the housing,
wherein the accessory-side apparatus detachably attaching portion includes an attachment/detachment surface extending over a plane perpendicular to a direction connecting together the accessory-side apparatus detachably attaching portion and the accessory attaching portion;
wherein a portion of the housing constituting the accessory-side apparatus detachably attaching portion includes an internally threaded portion extending perpendicular to the attachment/detachment surface and open on the attachment/detachment surface;
wherein an interior portion of the housing includes a spacing in communication with the internally threaded portion;

wherein the rotationally operable ring is supported by the housing, with a central portion positioned in the spacing, to be immobilizable along an axial direction of the internally threaded portion and to be rotatable about an axial center of the internally threaded portion;

wherein the externally threaded member is disposed on the axial center of the internally threaded portion in the spacing, wherein, in a central portion of the rotationally operable ring, the externally threaded member is movable along the axial direction of the internally threaded portion and includes a longitudinal part coupled to the rotationally operable ring to be integrally rotatable with the rotationally operable ring about the axial center of the internally threaded portion;

wherein the externally threaded member is positioned either in a retraction position by rotation of the externally threaded member in one direction or in an extension position by rotation of rotationally operable ring in an other direction opposite to the one direction, the retraction position being a position wherein the externally threaded portion of the externally threaded member is retracted from the internally threaded portion, and the extension position being a position wherein the externally threaded portion of the externally threaded member engaged with the internally threaded portion and a lead end portion of the externally threaded portion is extended from the attachment/detachment surface;

wherein the externally threaded member includes an axial portion having a non-circular cross section and is provided coaxially with the axial portion; and an engagement hole exists in a center of the rotationally operable ring, and wherein the rotationally operable ring rotates integrally with the axial portion through the engagement hole, and the axial portion engages the engagement hole to be movable along the axial direction of the internally threaded portion.

11. An accessory attaching device, comprising:

a housing;

a rotationally operable ring built-in in the housing;

an externally threaded member built-in in the housing;

an accessory-side apparatus detachably attaching portion detachably attachable to an apparatus-side detachably attaching portion of an apparatus, and an accessory attaching portion for attaching an accessory, in mutually opposite portions of the housing, wherein the accessory-side apparatus detachably attaching portion includes an attachment/detachment surface extending over a plane perpendicular to a direction connecting together the accessory-side apparatus detachably attaching portion and the accessory attaching portion;

wherein a portion of the housing constituting the accessory-side apparatus detachably attaching portion includes an internally threaded portion extending perpendicular to the attachment/detachment surface and open on the attachment/detachment surface;

wherein an interior portion of the housing includes a spacing in communication with the internally threaded portion;

wherein the rotationally operable ring is supported by the housing, with a central portion positioned in the spacing, to be immobilizable along an axial direction of the internally threaded portion and to be rotatable about an axial center of the internally threaded portion;

wherein the externally threaded member is disposed on the axial center of the internally threaded portion in the spacing, wherein, in a central portion of the rotationally operable ring, the externally threaded member is movable along the axial direction of the internally threaded portion and includes a longitudinal part coupled to the rotationally operable ring to be integrally rotatable with the rotationally operable ring about the axial center of the internally threaded portion; and wherein the externally threaded member is positioned either in a retraction position by rotation of the externally threaded member in one direction or in an extension position by rotation of rotationally operable ring in an other direction opposite to the one direction, the retraction position being a position wherein the externally threaded portion of the externally threaded member is retracted from the internally threaded portion, and the extension position being a position wherein the externally threaded portion of the externally threaded member engaged with the internally threaded portion and a lead end portion of the externally threaded portion is extended from the attachment/detachment surface; and wherein the attachment/detachment surface has a rectangular shape; and the accessory-side apparatus detachably attaching portion includes the attachment/detachment surface, a pair of lateral surfaces, and a pair of grooves, the pair of lateral surfaces, respectively, elevating at right angles from one pair of sides of two pairs of sides, which are opposite one another, of the attachment/detachment surface, and the pair of grooves respectively extending through the pair of lateral surfaces along a direction of one pair of sides and respectively elevating at right angles from the other pair of sides of the two pairs of sides.

12. An accessory to be detachably attached to an apparatus-side detachably attaching portion of an apparatus, the accessory comprising an accessory body and an accessory attaching device, the accessory attaching device including:

a housing;

a rotationally operable ring built-in in the housing;

an externally threaded member built-in in the housing; and an accessory-side apparatus detachably attaching portion detachably attachable to an apparatus-side detachably attaching portion of an apparatus, and an accessory attaching portion for attaching the accessory, in mutually opposite portions of the housing, wherein the accessory-side apparatus detachably attaching portion includes an attachment/detachment surface extending over a plane perpendicular to a direction connecting together the accessory-side apparatus detachably attaching portion and the accessory attaching portion;

wherein a portion of the housing constituting the accessory-side apparatus detachably attaching portion includes an internally threaded portion extending perpendicular to the attachment/detachment surface and open on the attachment/detachment surface;

wherein an interior portion of the housing includes a spacing in communication with the internally threaded portion;

wherein the rotationally operable ring is supported by the housing, with a central portion positioned in the spacing, to be immobilizable along an axial direction of the internally threaded portion and to be rotatable about an axial center of the internally threaded portion;

wherein the externally threaded member is disposed on the axial center of the internally threaded portion in the spacing, wherein, in a central portion of the rotationally operable ring, the externally threaded member is movable along the axial direction of the internally threaded portion and includes a longitudinal part coupled to the rotationally operable ring to be integrally rotatable with the rotationally operable ring about the axial center of the internally threaded portion; and wherein the externally threaded member is positioned either in a retraction position by rotation of the externally threaded member in one direction or in an extension position by rotation of rotationally operable ring in an other direction opposite to the one direction, the retraction position being a position wherein the externally threaded portion of the externally threaded member is retracted from the internally threaded portion, and the extension position being a position wherein the externally threaded portion of the externally threaded member engaged with the internally threaded portion and a lead end portion of the externally threaded portion is extended from the attachment/detachment surface; and a spring in the spacing, the spring urging toward the retraction position the externally threaded member positioned in the extension position.

13. An accessory to be detachably attached to an apparatus-side detachably attaching portion of an apparatus, the accessory comprising an accessory attaching device integrated with an accessory body, the accessory attaching device including:

a housing;

a rotationally operable ring built-in in the housing;

an externally threaded member built-in in the housing; and an accessory-side apparatus detachably attaching portion detachably attachable to an apparatus-side detachably attaching portion of an apparatus, and an accessory attaching portion for attaching the accessory, in mutually opposite portions of the housing, wherein the accessory-side apparatus detachably attaching portion includes an attachment/detachment surface extending over a plane perpendicular to a direction connecting together the accessory-side apparatus detachably attaching portion and the accessory attaching portion;

wherein a portion of the housing constituting the accessory-side apparatus detachably attaching portion includes an internally threaded portion extending perpendicular to the attachment/detachment surface and open on the attachment/detachment surface;

wherein an interior portion of the housing includes a spacing in communication with the internally threaded portion;

wherein the rotationally operable ring is supported by the housing, with a central portion positioned in the spacing, to be immobilizable along an axial direction of the internally threaded portion and to be rotatable about an axial center of the internally threaded portion;

wherein the externally threaded member is disposed on the axial center of the internally threaded portion in the spacing, wherein, in a central portion of the rotationally operable ring, the externally threaded member is movable along the axial direction of the internally threaded portion and includes a longitudinal part coupled to the rotationally operable ring to be integrally rotatable with the rotationally operable ring about the axial center of the internally threaded portion; and wherein the externally threaded member is positioned either in a retraction position by rotation of the externally threaded member in one direction or in an extension position by rotation of rotationally operable ring in an other direction opposite to the one direction, the retraction position being a position wherein the externally threaded portion of the externally threaded member is retracted from the internally threaded portion, and the extension position being a position wherein the externally threaded portion of the externally threaded member engaged with the internally threaded portion and a lead end portion of the externally threaded portion is extended from the attachment/detachment surface; and a spring in the spacing, the spring urging toward the retraction position the externally threaded member positioned in the extension position.

* * * * *